(12) United States Patent
Shimomura

(10) Patent No.: US 10,670,845 B2
(45) Date of Patent: Jun. 2, 2020

(54) ZOOM LENS AND IMAGE PICKUP APPARATUS HAVING THE SAME

(71) Applicant: CANON KABUSHIKI KAISHA, Tokyo (JP)

(72) Inventor: Kazuya Shimomura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 15/889,520

(22) Filed: Feb. 6, 2018

(65) Prior Publication Data

US 2018/0224640 A1 Aug. 9, 2018

(30) Foreign Application Priority Data

Feb. 8, 2017 (JP) .................................. 2017-021499

(51) Int. Cl.
*G02B 15/14* (2006.01)
*G02B 9/60* (2006.01)
*G02B 15/17* (2006.01)

(52) U.S. Cl.
CPC ............... *G02B 15/14* (2013.01); *G02B 9/60* (2013.01); *G02B 15/17* (2013.01)

(58) Field of Classification Search
CPC ... G02B 9/00; G02B 9/60; G02B 9/62; G02B 9/64; G02B 13/00; G02B 13/02; G02B 13/04; G02B 15/00; G02B 15/02; G02B 15/04; G02B 15/14
USPC ......... 359/676, 680–682, 745–746, 749–753
See application file for complete search history.

(56) References Cited

U.S. PATENT DOCUMENTS

| 9,264,638 | B2 | 2/2016 | Nakamura et al. |
| 9,268,120 | B2 | 2/2016 | Shimomura et al. |
| 9,310,592 | B2 | 4/2016 | Wakazono et al. |
| 9,329,372 | B2 | 5/2016 | Shimomura |

(Continued)

FOREIGN PATENT DOCUMENTS

| JP | 2015-161693 A | 9/2015 |
| JP | 2016024341 A | 2/2016 |

(Continued)

OTHER PUBLICATIONS

Extended European Search Report dated Jun. 20, 2018 corresponding to European Appln. No. EP 18 00 0080, 9 pages.

(Continued)

*Primary Examiner* — Robert E. Tallman
(74) *Attorney, Agent, or Firm* — Carter, DeLuca & Farrell LLP

(57) ABSTRACT

A zoom lens includes in order from an object side: a positive first lens unit not moving for zooming; a negative second lens unit moving for zooming; a negative third lens unit moving for zooming; an intermediate lens group including a lens unit and moving for zooming; and a rear lens group including a lens unit, a lens unit, closest to an object of the zoom lens, not moving for zooming, an aperture stop being placed on a side of the object to or in the rear lens group, a distances between each pair of adjacent lens units changes for zooming, and a distance between the second and third lens units at a wide angle end, a distance between the second and third lens units at a telephoto end, and a maximum distance between the second and third lens units in a certain zoom range are appropriately set.

8 Claims, 14 Drawing Sheets

(56) References Cited

U.S. PATENT DOCUMENTS

| | | |
|---|---|---|
| 9,400,374 B2 | 7/2016 | Yoshimi et al. |
| 9,678,318 B2 | 6/2017 | Nakamura et al. |
| 9,716,829 B2 | 7/2017 | Shimomura |
| 9,904,043 B2 | 2/2018 | Shimomura et al. |
| 2012/0262608 A1 | 10/2012 | Nakamura et al. |
| 2012/0262798 A1 | 10/2012 | Takemoto et al. |
| 2014/0049672 A1* | 2/2014 | Sakamoto ............. G02B 15/14 348/294 |
| 2017/0108678 A1 | 4/2017 | Miyazawa et al. |

FOREIGN PATENT DOCUMENTS

| | | |
|---|---|---|
| JP | 2016173529 A | 9/2016 |
| JP | 2016173530 A | 9/2016 |
| WO | 2013/031203 A1 | 3/2013 |

OTHER PUBLICATIONS

European Search Report dated Jul. 19, 2018 corresponding to European Appln. No. EP 18 00 0080.4 (9 pages).

\* cited by examiner

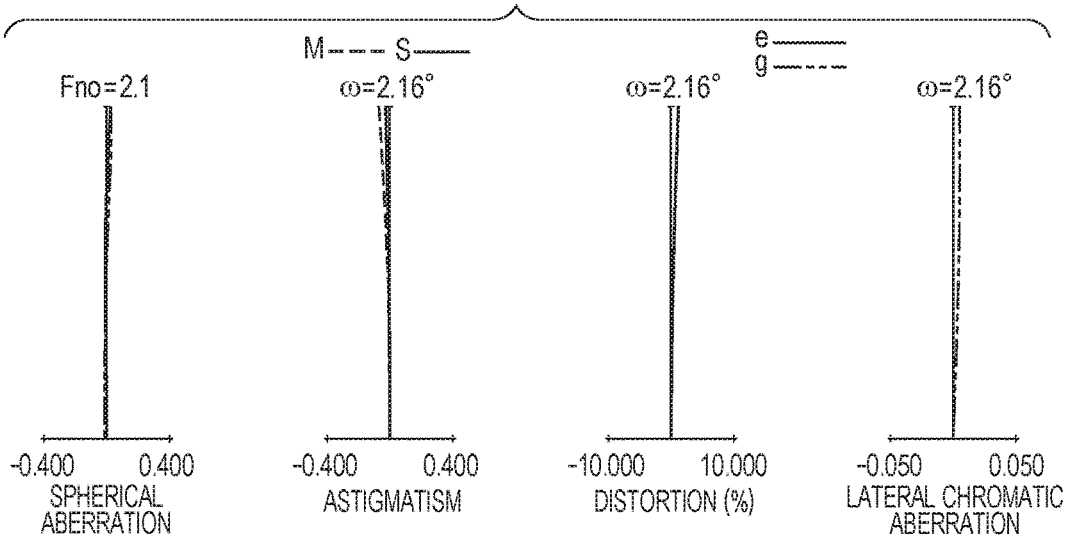
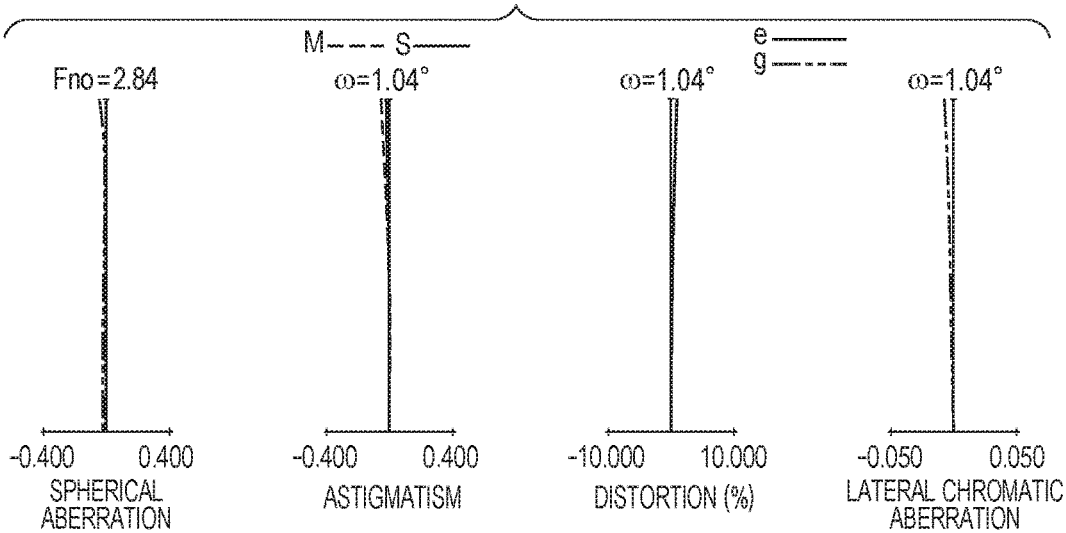
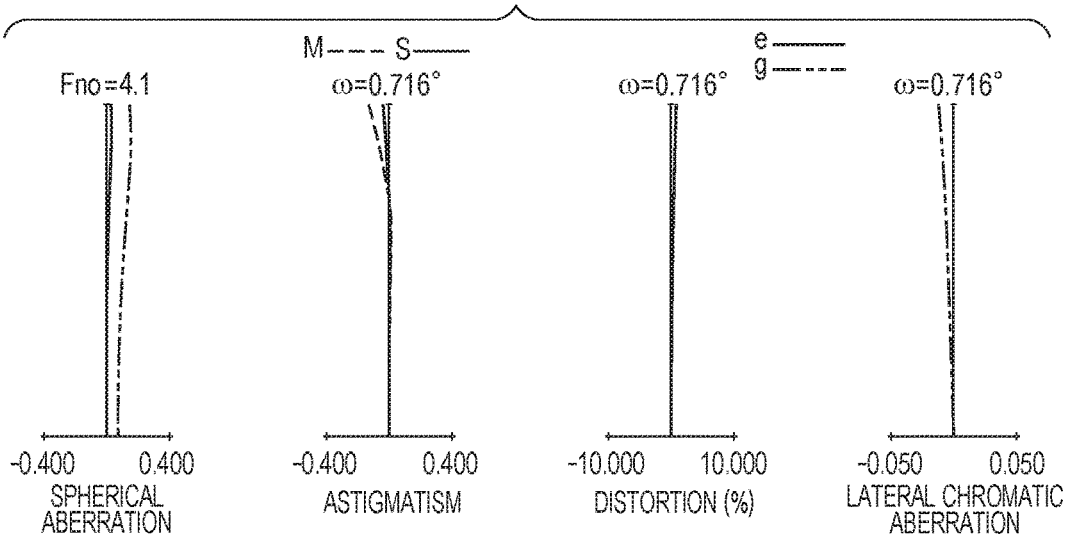

ZOOM LENS AND IMAGE PICKUP APPARATUS HAVING THE SAME

BACKGROUND OF THE INVENTION

Field of the Invention

The present invention relates to a zoom lens and an image pickup apparatus.

Description of the Related Art

In recent years, for image pickup apparatuses such as television cameras, movie cameras, digital still cameras, and cameras for silver halide photography, there has been a demand for a zoom lens having a wide angle of view, a high zoom ratio, and high optical performance. An image pickup device, such as a CCD or a CMOS, used in a professional video filming system like a television or movie camera has a substantially uniform resolution over the entire image pickup range. A zoom lens used with such an image pickup device is required to have a substantially uniform resolution from the center to the periphery of the image.

As a zoom lens with a wide angle of view and a high zoom ratio, a zoom lens of a positive lead type is known, which includes, in order from an object side, a first lens unit having a positive refractive power and a second lens unit for zooming having a negative refractive power. For example, Japanese Patent Application Laid-Open No. 2015-161693 and International Publication No. WO2013/031203 disclose zoom lenses including, in order from the object side, a first lens unit having a positive refractive power, second, third, and fourth lens units each having a negative refractive power, and a fifth lens unit having a positive refractive power, with three of these lens units being configured to move for zooming. In the zoom lens of International Publication No. WO2013/031203, the lens units move so that a distance between the second and third lens units is always widened for zooming from the wide angle end to the telephoto end.

In order for a zoom lens of a positive lead type configured as above to achieve high optical performance and size reduction at the same time, it is important to appropriately set refractive powers of the lenses and movement loci of the lens units. When a wider angle of view, a higher zoom ratio, and a smaller size are accomplished at the same time, aberrations increase particularly for a focal length range from a zoom middle position (fw×$Z^{0.7}$) to a telephoto end, leading to degradation in performance in the periphery of the image.

However, in the zoom lens disclosed in Japanese Patent Application Laid-Open No. 2015-161693, a change in the distance between the second lens unit and the third lens unit for zooming from the wide angle end to a zoom middle position is small, and no effective measure is taken to correct the aberrations for the zoom middle position. In addition, International Publication No. WO2013/031203 does not disclose the movement loci of the moving units in the focal length range from the zoom middle position (fw×$Z^{0.7}$) to the telephoto end where aberrations increase, and no effective measure is taken to correct the aberrations.

SUMMARY OF THE INVENTION

The present invention provides, for example, a zoom lens advantageous in its wide angle of view, high zoom ratio, reduced size and weight, and high optical performance over its entire zoom range.

To achieve the objective of the present invention, a zoom lens comprises in order from an object side to an image side thereof: a first lens unit having a positive refractive power and configured not to move for zooming; a second lens unit having a negative refractive power and configured to move for zooming; a third lens unit having a negative refractive power and configured to move for zooming; an intermediate lens group including at least one lens unit and configured to move for zooming; and a rear lens group including at least one lens unit, a lens unit therein, closest to an object of the zoom lens, being configured not to move for zooming, in which the zoom lens comprises an aperture stop placed on a side of the object with respect to the rear lens group or placed in the rear lens group, in which a distances between each pair of adjacent ones of the lens units changes for zooming, and in which the zoom lens satisfies conditional expressions, $1.3 < L2\text{max}/L2w < 3.0$, and $0.8 < L2\text{max}/L2t < 4.0$, where L2w is a distance between the second lens unit and the third lens unit at a wide angle end, L2t is a distance between the second lens unit and the third lens unit at a telephoto end, and L2max is a maximum distance between the second lens unit and the third lens unit in a zoom range from a focal length ftm1 to a focal length ftm2, ftm1 and ftm2 being respectively defined as $ftm1 = fw \times Z^{0.7}$, and $ftm2 = fw \times Z^{0.9}$, where fw is a focal length of the zoom lens at the wide angle end, and Z is a zoom ratio of the zoom lens.

Further features of the present invention will become apparent from the following description of exemplary embodiments with reference to the attached drawings.

BRIEF DESCRIPTION OF THE DRAWINGS

FIG. 6B is an aberration diagram of the zoom lens according to Numerical Embodiment 3 at f=145.5 mm, focused at infinity.

FIG. 6C is an aberration diagram of the zoom lens according to Numerical Embodiment 3 at f=304.3 mm, focused at infinity.

FIG. 6D is an aberration diagram of the zoom lens according to Numerical Embodiment 3 at the telephoto end, focused at infinity.

DESCRIPTION OF THE EMBODIMENTS

Preferred embodiments of the present invention will now be described in detail in accordance with the accompanying drawings.

First, the characteristics of a zoom lens of the present invention are described based on conditional expressions. The movement loci of a second lens unit and a third lens unit of the zoom lens of the present invention are defined so that the zoom lens can achieve a wide angle of view, a high zoom ratio, size and weight reduction, and high optical performance over the entire zoom range.

The zoom lens of the present invention and an image pickup apparatus having the same includes, in order from an object side to an image side, a first lens unit having a positive refractive power, a second lens unit having a negative refractive power, a third lens unit having a negative refractive power, an intermediate lens group including at least one lens unit, and a rear lens group including at least one lens unit. An aperture stop is placed either on the object side of the rear lens group or inside the rear lens group. The first lens unit is configured not to move for zooming, the second lens unit is configured to move for zooming, the third lens unit is configured to move for zooming, and the intermediate lens group is configured to move for zooming. The lens unit in the rear lens group closest to the object side is configured not to move for zooming. This means that the rear lens group is configured not to move for zooming if the rear lens group includes only one lens unit, and that the lens unit in the rear lens group closest to the object is configured not to move for zooming if the rear lens group includes more than one lens unit. Further, the zoom lens is so configured that the distances between the adjacent lens units change for zooming.

The zoom lens satisfies the following expressions:

$$1.3 < L2max/L2w < 3.0, \text{ and} \quad (1)$$

$$0.8 < L2max/L2t < 4.0, \quad (2)$$

where L2w is the distance between the second lens unit and the third lens unit at the wide angle end, L2t is the distance between the second lens unit and the third lens unit at the telephoto end, and L2max is the maximum distance between the second lens unit and the third lens unit in the zoom range between a focal length ftm1 and a focal length ftm2 which are defined as follows:

$$ftm1 = fw \times Z^{0.7}, \text{ and} \quad (a)$$

$$ftm2 = fw \times Z^{0.9}, \quad (b)$$

where fw is the focal length of the zoom lens at the wide angle end, and Z is the zoom ratio.

Figure 13A:
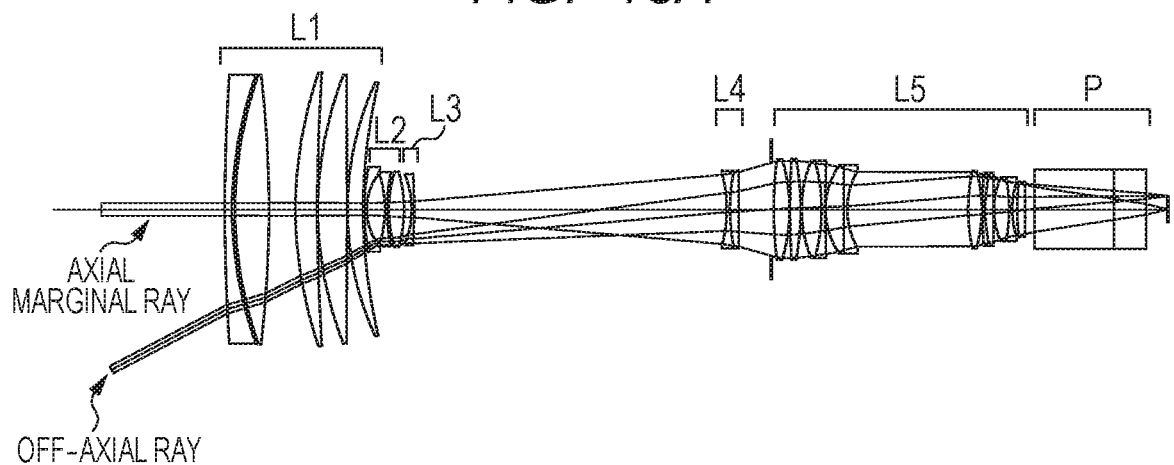
FIG. 13A is a diagram illustrating an optical path in the zoom lens of Numerical Embodiment 1 at the wide angle end.
Figure 13B:
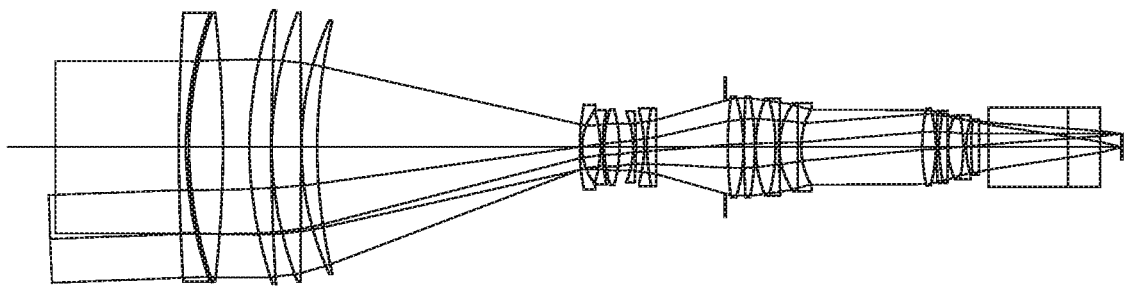
FIG. 13B is a diagram illustrating an optical path in the zoom lens of Numerical Embodiment 1 at f=145.5 mm.
Figure 13C:
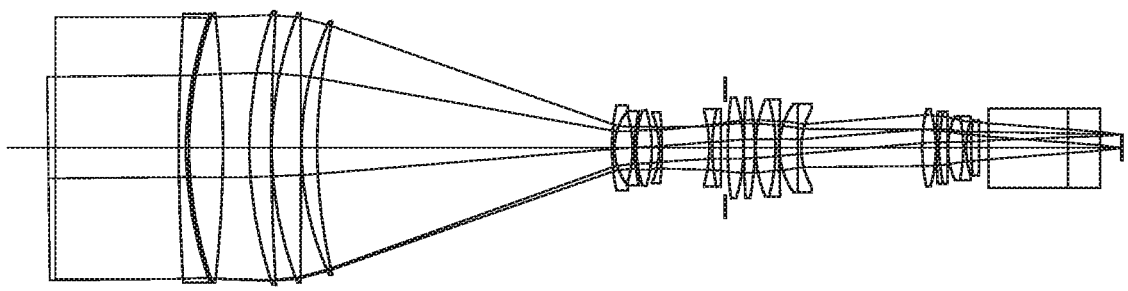
FIG. 13C is a diagram illustrating an optical path in the zoom lens of Numerical Embodiment 1 at the telephoto end.

FIGS. 13A, 13B, and 13C are diagrams illustrating optical paths in the zoom lens of Numerical Embodiment 1 of the present invention at the wide angle end, at f=145.5 mm ($fw \times Z^{0.7}$), and at the telephoto end, respectively. "L1" to "L5" denote the first to fifth lens units, respectively. In the present invention, the movement loci of the second lens and the third lens are set so that the distance between the second lens unit and the third lens unit may be widened for zooming from the wide angle end to the zoom middle range ($fw \times Z^{0.7}$ to $fw \times Z^{0.9}$), and become a predetermined distance for zooming from the zoom middle range to the telephoto end. Optical effects by this are described.

In a zoom lens of a positive lead type, the beam height of the principal ray of off-axial rays passing through the first lens unit start to descend particularly in the zoom middle range ($fw \times Z^{0.7}$ to $fw \times Z^{0.9}$), and therefore the curvature of field tends to occur in an overcorrected direction (to the image side). As can be seen in FIGS. 13A, 13B, and 13C, by moving the third lens unit away from the second lens unit to the image side, the beam height of the off-axial rays passing through the third lens unit is lowered, which reduces the curvature of field in the overcorrected direction occurring in the third lens unit. Thus, the curvature of field in the overcorrected direction which tends to occur in the zoom middle range can be favorably corrected.

Expressions (1) and (2) define the distances between the second lens unit and the third lens unit in the zoom middle range ($fw \times Z^{0.7}$ to $fw \times Z^{0.9}$). By satisfying Expression (1), the zoom lens can favorably correct curvature of field in the zoom middle range, achieving high optical performance over the entire zoom range. When the zoom lens does not satisfy the upper limit of Expression (1), the distance between the third lens unit and the third lens unit becomes so long that it is difficult to correct axial chromatic aberration in the zoom middle range. When the zoom lens does not satisfy the lower limit of Expression (1), the distance between the second lens unit and the third lens unit is not long enough relative to that at the wide angle end, and the above-described effects of the curvature of field correction becomes so small that it is difficult to achieve high optical performance over the entire zoom range.

Further, by satisfying Expression (2), the zoom lens achieves both size reduction and high optical performance. When the zoom lens does not satisfy the upper limit of Expression (2), the distance between the second lens unit and the third lens unit becomes so long that it is difficult to correct axial chromatic aberration in the zoom middle range. When the zoom lens does not satisfy the lower limit of Expression (2), the distance between the second lens unit and the third lens unit at the telephoto end becomes too long relative to that in the zoom middle range. Consequently, the combined focal length of the second lens unit and the third lens unit becomes short, and zooming roles assigned to the second lens unit and the third lens unit become small. The zoom ratio is reduced as a result, making it difficult to reduce the size of the zoom lens. It is preferable when numerical values in Expressions (1) and (2) are set as follows:

$$1.32 < L2max/L2w < 2.20, \text{ and} \tag{1a}$$

$$0.9 < L2max/L2t < 3.0. \tag{2a}$$

As an additional mode of the zoom lens of the present invention, the rear lens group has at least two convex lenses and at least one concave lens, and is configured not to move for zooming.

As an additional mode of the zoom lens of the present invention, the rear lens group has at least two convex lenses and at least one concave lens. A lens unit LRR, which is one of the lens units in the rear lens group, is configured to move for zooming. The zoom lens satisfies the following expression:

$$|mrr/drr| < 0.1 \tag{3}$$

where mrr is the maximum movement amount of the lens unit LRR in the entire zoom range, and drr is the distance between the surface of the lens unit LRR closest to the object side and the surface of the lens unit LRR closest to the image side. The lens unit LRR may move for zooming within the range satisfying Expression (3) to correct off-axial aberration. Further, defocusing caused by zooming may be corrected by moving the lens unit LRR in conjunction with a zooming operation.

As an additional mode of the zoom lens of the present invention, the zoom lens satisfies the following expression:

$$-10.0 < f1 \times (f2+f3)/(f2 \times f3) < -2.0 \tag{4}$$

where f1, f2, and f3 are the focal lengths of the first lens unit, the second lens unit, and the third lens unit, respectively. A numerical value of (f2×f3)/(f2+f3) corresponds to the combined focal length of the second lens unit and the third lens unit. By satisfying Expression (4), the zoom lens achieves both size reduction and high optical performance. When the zoom lens does not satisfy the upper limit of Expression (4), the first lens unit has too strong a refractive power relative to the second lens unit, which makes it difficult to correct distortion at the wide angle end or axial chromatic aberration at the telephoto end. When the zoom lens does not satisfy the lower limit of Expression (4), the first lens unit has too weak a refractive power relative to the second lens unit, which increases the size of the first lens unit in particular, making size reduction difficult. It is preferable when the numerical values in Expression (4) are set as follows:

$$-8.5 < f1 \times (f2+f3)/(f2 \times f3) < -3.5 \tag{4a}$$

As an additional mode of the zoom lens of the present invention, the zoom lens satisfies the following expression:

$$0.1 < f2/f3 < 10.0 \tag{5}$$

where f2 and f3 are the focal lengths of the second lens unit and the third lens unit, respectively. When the zoom lens does not satisfy the upper limit of Expression (5), the third lens unit has too strong a refractive power relative to the second lens unit, and the third lens unit becomes more sensitive to manufacturing error at the telephoto end. In particular, the curvature of field and comatic aberration occur more, degrading manufacturability. When the zoom lens does not satisfy the lower limit of Expression (5), the second lens unit has too strong a refractive power relative to the third lens unit, which increases aberrations occurring in the second lens unit, making it difficult to achieve high optical performance over the entire zoom range. It is preferable when the numerical values in Expression (5) are set as follows:

$$0.15 < f2/f3 < 6.00. \tag{5a}$$

As an additional mode of the zoom lens of the present invention, the second lens unit and the third lens unit collectively include at least one convex lens and at least two concave lenses. Such a lens configuration enables the lenses constituting the second lens unit and the third lens unit to have appropriate refractive powers to be able to favorably correct the aberrations in the zoom middle range and axial chromatic aberration at the telephoto end.

As an additional mode of the zoom lens of the present invention, the second lens unit or the third lens unit has at least one aspherical surface. This achieves effective correction of the curvature of field and spherical aberration in the zoom middle range.

As an additional mode of the zoom lens of the present invention, the zoom lens satisfies the following expression:

$$-2 < (R2+R3)/(R2-R3) < 30 \tag{6}$$

where R2 is the radius of curvature of the surface of the second lens unit closest to the image side, and R3 is the radius of curvature of the surface of the third lens unit closest to the object side. When the zoom lens does not satisfy the upper limit of Expression (6), the difference between the radius of curvature of the surface of the second lens unit closest to the image side and the that of the surface of the third lens unit closest to the object side becomes small, making it difficult to favorably correct the aberrations in the zoom middle range and at the telephoto end. When the zoom lens does not satisfy the lower limit of Expression (6), the difference between the radius of curvature of the surface of the second lens unit closest to the image side and the that of the surface of the third lens unit closest to the object side becomes large, which makes the distance between the second lens unit and the third lens unit sensitive to manufacturing error. It is preferable when the numerical values in Expression (6) are set as follows:

$$-1<(R2+R3)/(R2-R3)<20. \quad (6a)$$

Further, the image pickup apparatus of the present invention is characterized by including the zoom lens of any of the embodiments and a solid-state image pickup element having a predetermined effective image pickup range for receiving an optical image formed by the zoom lens.

The specific configuration of the zoom lens of the present invention is described based on the characteristics of the lens configurations of Numerical Embodiments 1 to 6 corresponding to Embodiments 1 to 6.

Embodiment 1

Figure 1:
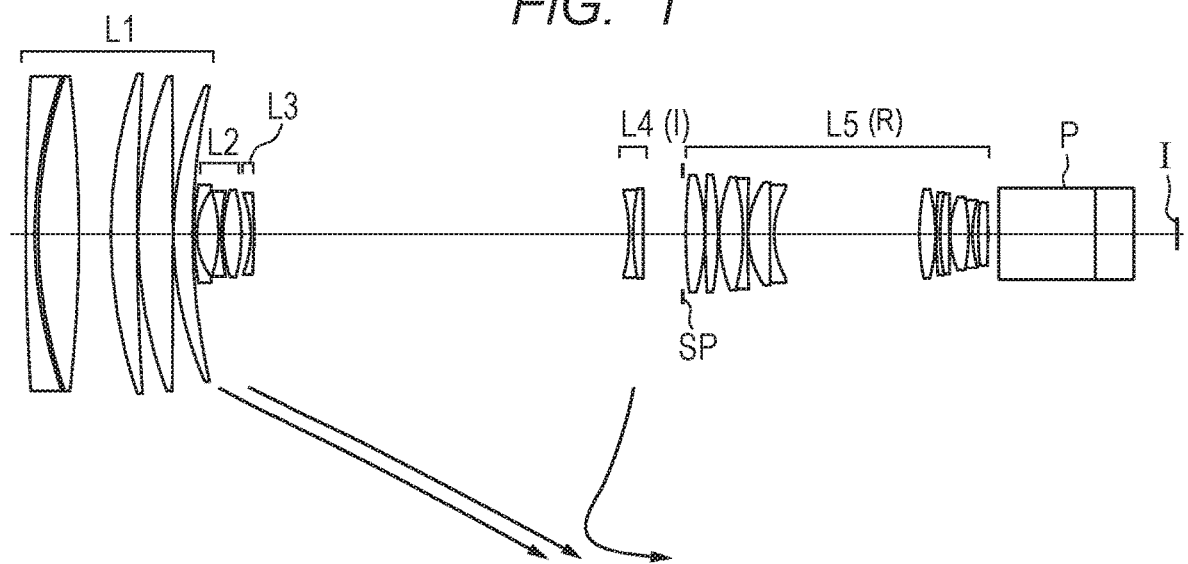
FIG. 1 is a lens sectional diagram of a zoom lens according to Numerical Embodiment 1 at the wide angle end, focused at infinity.
Figure 2A:
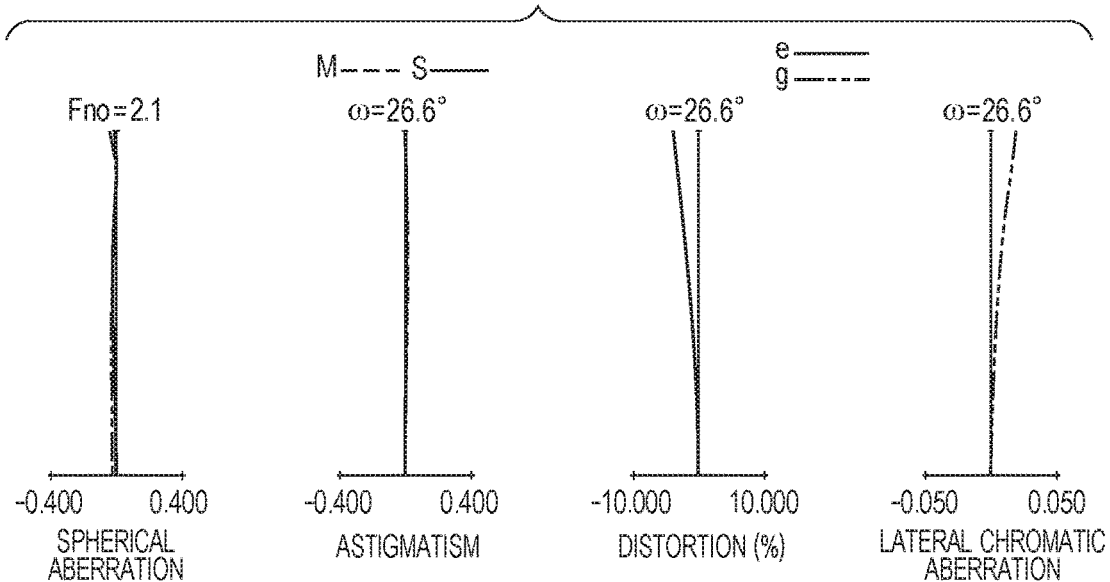
FIG. 2A is an aberration diagram of the zoom lens according to Numerical Embodiment 1 at the wide angle end, focused at infinity.
Figure 2B:
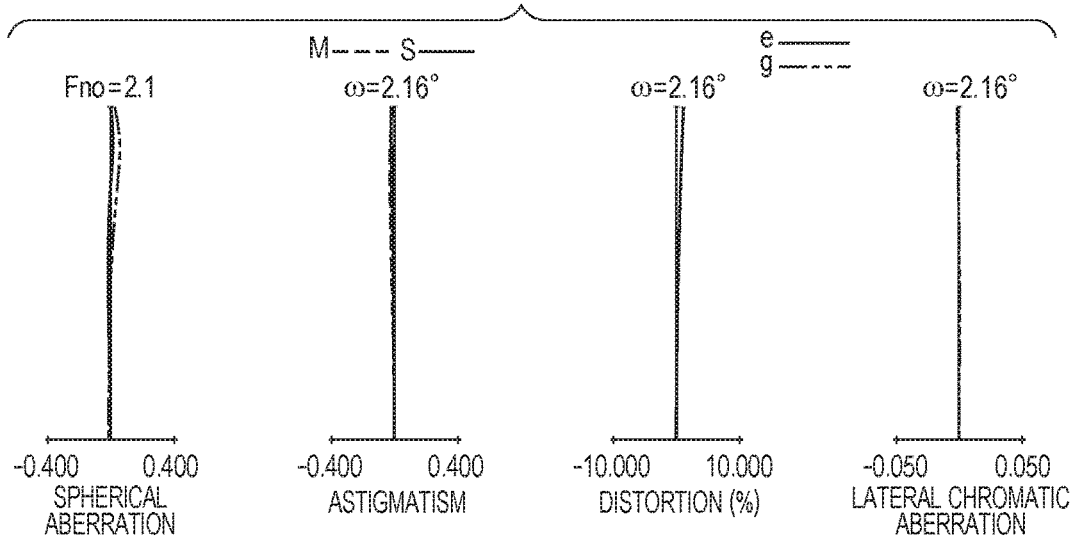
FIG. 2B is an aberration diagram of the zoom lens according to Numerical Embodiment 1 at f=145.5 mm, focused at infinity.
Figure 2C:
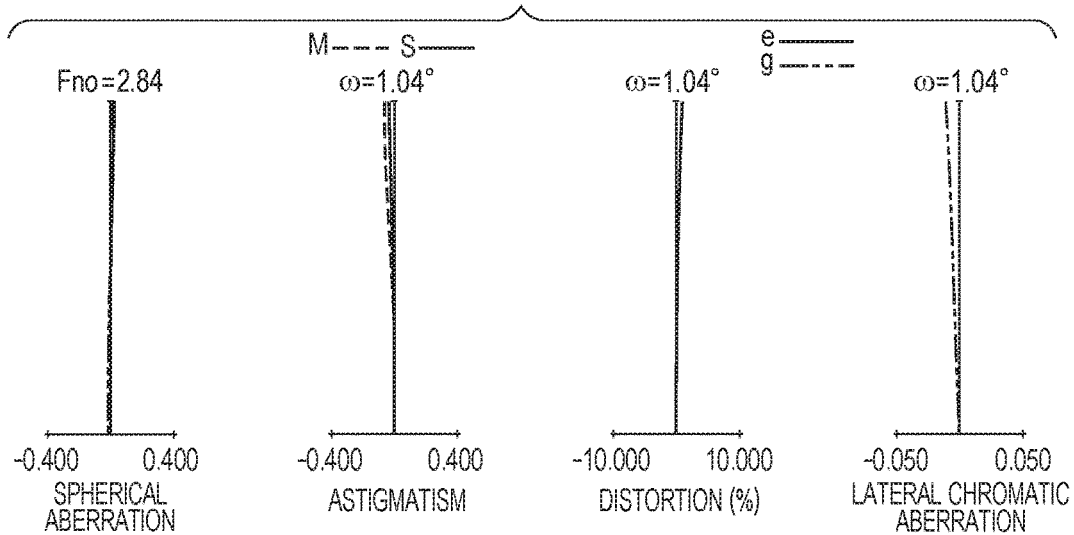
FIG. 2C is an aberration diagram of the zoom lens according to Numerical Embodiment 1 at f=304.3 mm, focused at infinity.
Figure 2D:
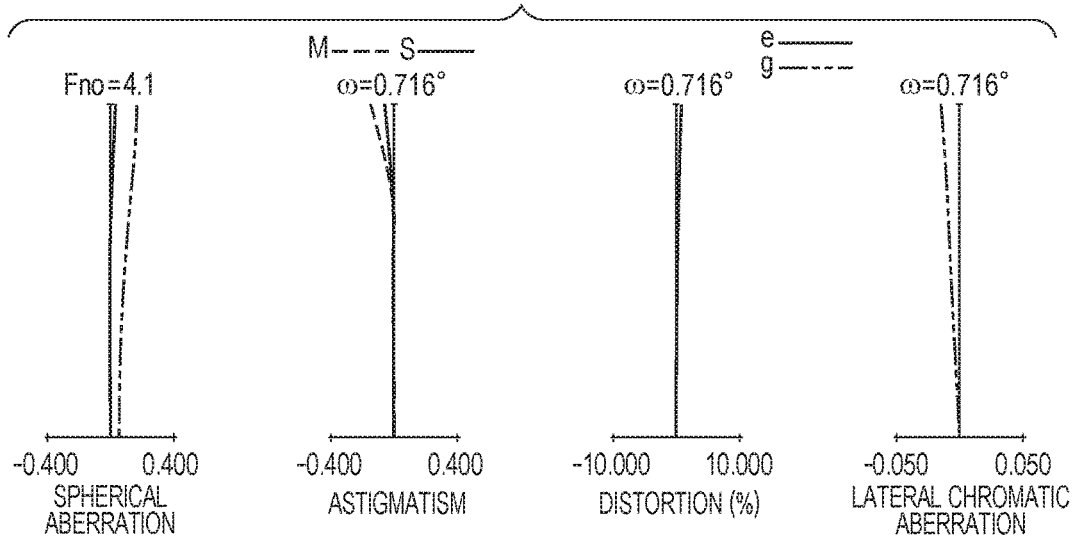
FIG. 2D is an aberration diagram of the zoom lens according to Numerical Embodiment 1 at the telephoto end, focused at infinity.

FIG. 1 is a lens sectional diagram of a zoom lens of Embodiment 1 (Numerical Embodiment 1) of the present invention at the wide angle end, focused at infinity. FIGS. 2A, 2B, 2C, and 2D are longitudinal aberration diagrams of the zoom lens of Numerical Embodiment 1 at the wide angle end, the focal length of 145.5 mm (fw×$Z^{0.7}$), the focal length of 304.3 mm (fw×$Z^{0.9}$), and the telephoto end, respectively. The zoom lens is focused at infinity in all the longitudinal aberration diagrams. The values of the focal lengths are ones in the numerical embodiments given later expressed in millimeters. This also applies to the rest of the numerical embodiments. The focal length of 145.5 mm is a zoom position where the distance between the second lens unit and the third lens unit is at the maximum in the range from fw×$Z^{0.7}$ to fw×$Z^{0.9}$.

The zoom lens in FIG. 1 includes, in order from the object side, a first lens unit L1 for focusing which has a positive refractive power, a second lens unit L2 for zooming and a third lens unit L3 which have negative refractive powers and move to the image side for zooming from the wide angle end to the telephoto end, a fourth lens unit L4 which has a negative refractive power and moves on the optical axis nonlinearly in conjunction with the movements of the second lens unit L2 and the third lens unit L3 to correct image plane displacement caused by the zooming, and a fifth lens unit L5 which is configured not to move for zooming and performs imaging effect. In the present embodiment, the fourth lens unit L4 forms the intermediate lens group.

In the present embodiment, the second lens unit L2, the third lens unit L3, and the fourth lens unit L4 constitute a zooming system. "SP" denotes an aperture stop and is placed between the fourth lens unit L4 and the fifth lens unit L5. The aperture stop does not move in the optical axis direction for zooming. "P" denotes a glass block corresponding to an optical filter or a color separation optical system placed inside the image pickup apparatus to which the zoom lens of the present invention is connected. "I" is an image plane. When the zoom lens is used as an image pickup optical system for a broadcasting television camera, a video camera, or a digital still camera, the image plane I is the image pickup surface of, for example, a solid-state image pickup element (photoelectric conversion element) that receives an optical image formed by the zoom lens and converts it photo-electrically. When the zoom lens is used as an image pickup optical system for a film camera, the image plane I is a film plane that is sensitive to an optical image formed by the zoom lens.

In the longitudinal aberration diagrams, the solid line and the two-dot dash line in the part showing spherical aberration denote e-line and g-line, respectively. In the part showing astigmatism, the broken line and the solid line denote the meridional image plane and the sagittal image plane, respectively. In the part showing the lateral chromatic aberration, the two-dot dash line denotes g-line. Additionally, "ω" denotes a half angle of view, and "Fno" denotes an f-number. In the longitudinal aberration diagrams, the spherical aberration is expressed based on a scale ranging from −0.4 to 0.4 mm, the astigmatism based on a scale ranging from −0.4 to 0.4 mm, the distortion based on a scale ranging from −10% to 10%, and the lateral chromatic aberration based on a scale ranging from −0.05 mm to 0.05 mm. In the following embodiments, the wide angle end and the telephoto end refer to zoom positions which are available ends of the zoom range in which the second lens unit L2 for zooming can move on an optical axis mechanically.

Next, a description is given of the lens configurations of the lens units of the present embodiment. The first lens unit L1 corresponds to the first to tenth surfaces, the second lens unit L2 the 11th to 16th surfaces, the third lens unit L3 the 17th to 18th surfaces, the fourth lens unit L4 the 19th to 21st surfaces, and the fifth lens unit L5 the 23rd to 42nd surfaces. The second lens unit L2 includes a total of three lenses including convex and concave lenses, and the third lens unit L3 includes one concave lens.

A description is given of Numerical Embodiment 1 corresponding to Embodiment 1. Not only in Numerical Embodiment 1 but also in all the numerical embodiments, "i" represents the ordinal number of a surface (an optical surface) from the object side, "ri" represents the radius of curvature of the i-th surface from the object side, and "di" represents the distance (on the optical axis) between the i-th surface and the (i+1)-th surface from the object side. Further, "ndi" and "vdi" respectively represent the refractive index and the Abbe number of a medium (an optical member) between the i-th surface and the (i+1)-th surface, and "BF" represents a back focal length in air. Note that an Abbe number ν is expressed as follows:

$$\nu=(Nd-1)/(NF-NC)$$

where NF, Nd, and NC are the refractive indices for Fraunhofer's F-line (486.1 nm), d-line (587.6 nm), and C-line (656.3 nm), respectively. An aspherical shape is expressed as follows when an X axis is the optical-axis direction, an H axis is perpendicular to the optical axis, and a light travelling direction is positive:

$$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16}$$

where R is a paraxial curvature radius, k is a conic constant, and A4, A6, A8, A10, A12, A14, and A16 are each an aspherical coefficient. Further, "e-Z" indicates "X$10^{-Z}$".

Table 1 shows numerical values in the conditional expressions for the present embodiment. The present embodiment satisfies Expressions (1), (2), (4) to (6). Since the movement loci of the second lens unit and the third lens unit are appropriately set, the zoom lens of the present embodiment favorably corrects the aberrations over the entire zoom range, achieving both high optical performance and reduction in size and weight. The zoom lens of the present invention must satisfy Expressions (1) and (2), but does not have to satisfy Expressions (3) to (6). Nonetheless, better effects are produced when at least one of Expressions (3) to (6) is satisfied. This is true for the rest of the embodiments.

Figure 14:
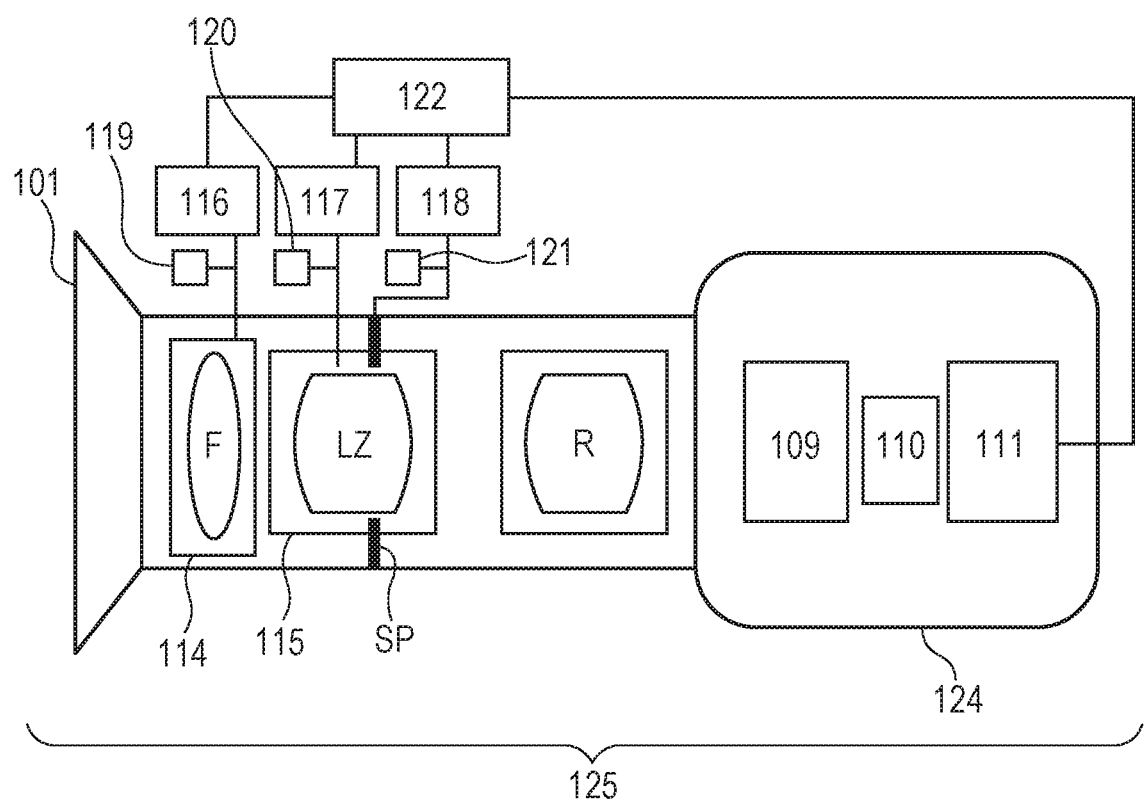
FIG. 14 is a schematic diagram illustrating a main portion of an image pickup apparatus of the present invention.

FIG. 14 is a schematic diagram of an image pickup apparatus (a television camera system) using the zoom lens of any of the embodiments as its image pickup optical system. In FIG. 14, reference numeral "101" denotes the zoom lens of any of Embodiments 1 to 6, and "124" denotes a camera. The zoom lens 101 is attachable to and detachable from the camera 124. Reference numeral "125" denotes an image pickup apparatus formed by attaching the zoom lens 101 to the camera 124. The zoom lens 101 has a first lens unit F, a zooming part LZ, and a rear lens group R for forming an image. The first lens unit F includes a lens unit for focusing. The zooming part LZ includes a second lens unit and a third lens unit that move on the optical axis for zooming and a fourth lens unit that moves on the optical axis for correcting image plane displacement caused by zooming. "SP" denotes an aperture stop. Reference numerals "114" and "115" denote driving mechanisms, such as a helicoid or a cam, that drive the first lens unit F and the zooming part LZ, respectively, in the optical-axis direction. Reference numerals "116" to "118" are motors (driving means) that electrically drive the driving mechanism 114, the driving mechanism 115, and the aperture stop SP, respectively. Reference numerals "119" to "121" are detectors, such as encoders, potentiometers, or photo-sensors, that detect the position of the first lens unit F on the optical axis, the position of the zooming part LZ on the optical axis, and the aperture diameter of the aperture stop SP, respectively. In the camera 124, "109" denotes a glass block corresponding to an optical filter or a color separation optical system in the camera 124, and "110" denotes a solid-state image pickup element (photoelectric conversion element), such as a CCD or CMOS sensor, that receives a subject's optical image formed by the zoom lens 101. In addition, "111" and "122" are CPUs that control driving of the camera 124 and the zoom lens 101, respectively.

When the zoom lens of the present invention is thus applied to an image pickup apparatus, or in the above example a television camera, the image pickup apparatus can achieve high optical performance.

Embodiment 2

Figure 3:
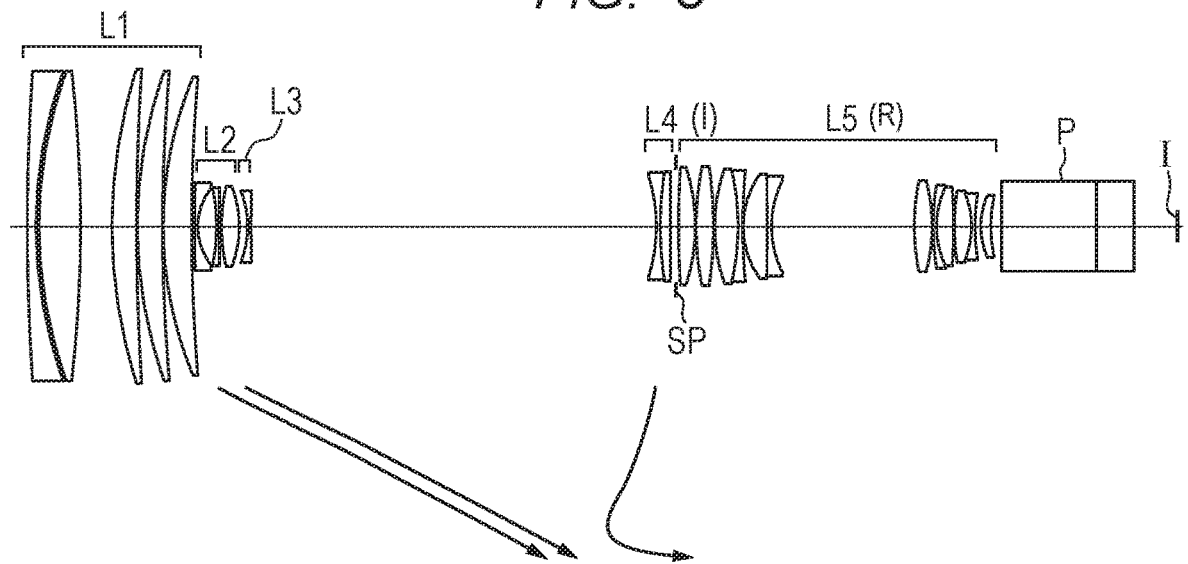
FIG. 3 is a lens sectional diagram of a zoom lens according to Numerical Embodiment 2 at the wide angle end, focused at infinity.
Figure 4A:
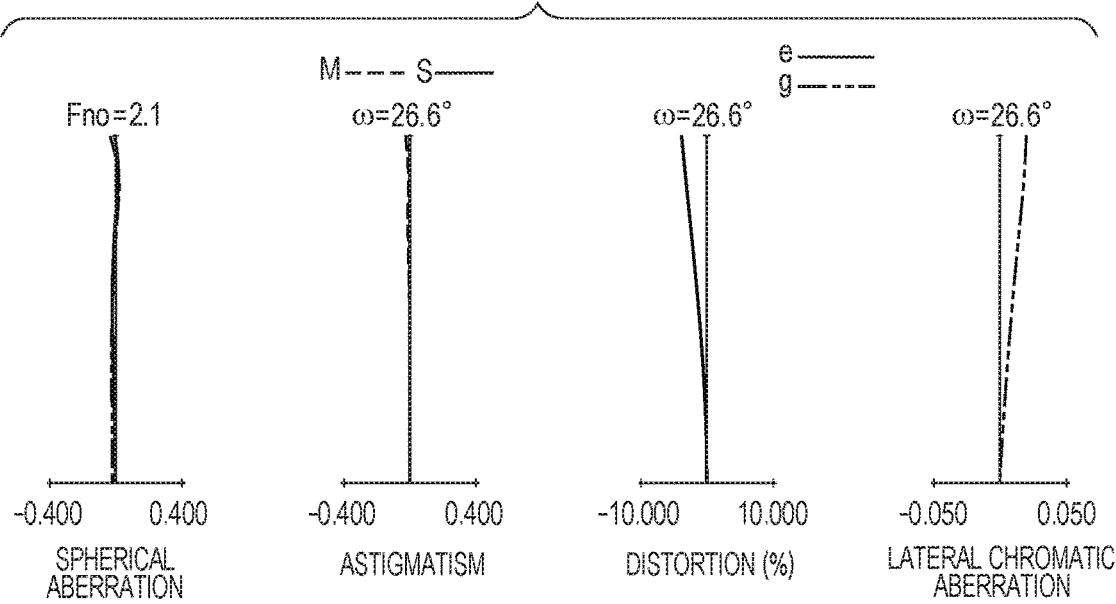
FIG. 4A is an aberration diagram of the zoom lens according to Numerical Embodiment 2 at the wide angle end, focused at infinity.
Figure 4B:
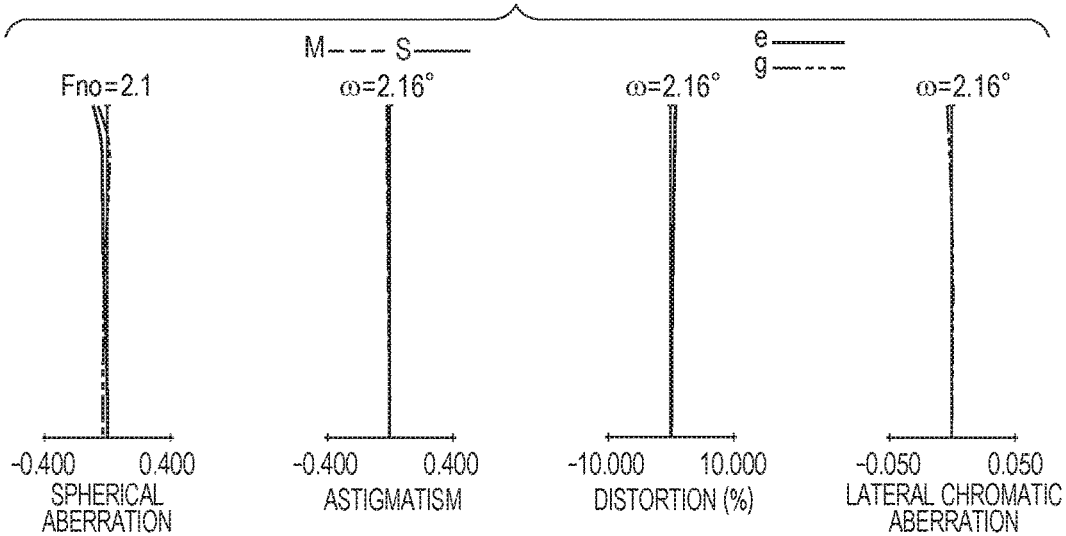
FIG. 4B is an aberration diagram of the zoom lens according to Numerical Embodiment 2 at f=145.5 mm, focused at infinity.
Figure 4C:
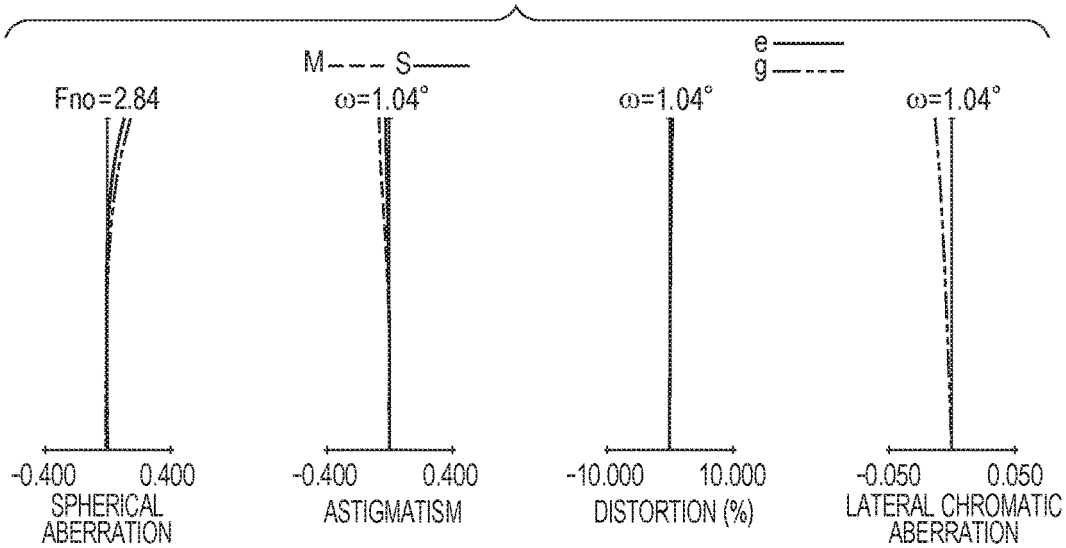
FIG. 4C is an aberration diagram of the zoom lens according to Numerical Embodiment 2 at f=304.3 mm, focused at infinity.
Figure 4D:
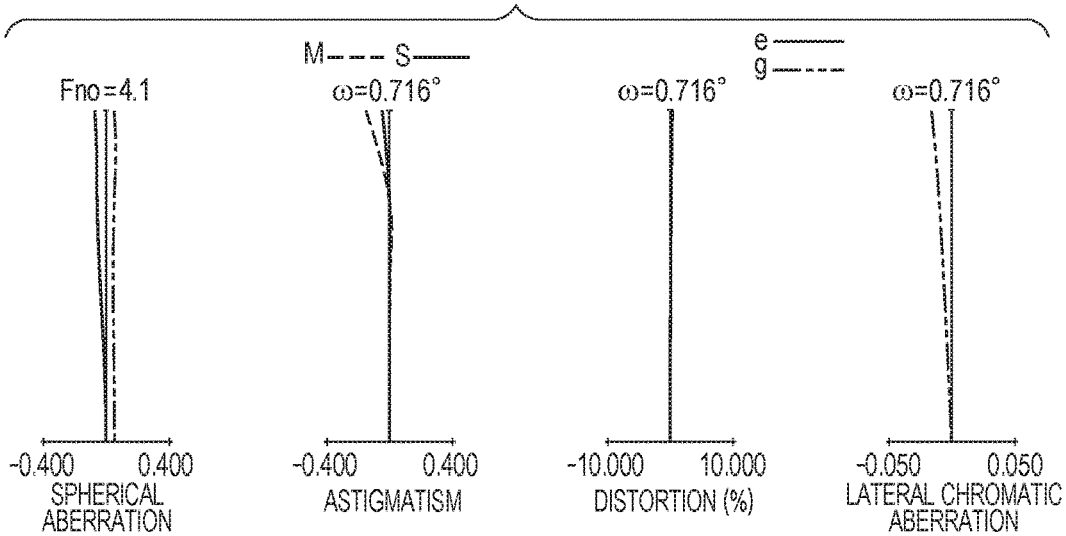
FIG. 4D is an aberration diagram of the zoom lens according to Numerical Embodiment 2 at the telephoto end, focused at infinity.

FIG. 3 is a lens sectional diagram of a zoom lens of Embodiment 2 (Numerical Embodiment 2) of the present invention at the wide angle end, focused at infinity. FIGS. 4A, 4B, 4C, and 4D are longitudinal aberration diagrams of the zoom lens of Numerical Embodiment 2 at the wide angle end, the focal length of 145.5 mm (fw×$Z^{0.7}$), the focal length of 304.3 mm (fw×$Z^{0.9}$), and the telephoto end, respectively. The zoom lens is focused at infinity in all the longitudinal aberration diagrams. The focal length of 304.3 mm is a zoom position where the distance between the second lens unit and the third lens unit is at the maximum in the range from fw×$Z^{0.7}$ to fw×$Z^{0.9}$.

The zoom lens in FIG. 3 includes, in order from the object side, a first lens unit L1 for focusing which has a positive refractive power, a second lens unit L2 for zooming and a third lens unit L3 which have negative refractive powers and move to the image side for zooming from the wide angle end to the telephoto end, a fourth lens unit L4 which has a negative refractive power and moves on the optical axis nonlinearly in conjunction with the movements of the second lens unit L2 and the third lens unit L3 to correct image plane displacement caused by the zooming, and a fifth lens unit L5 which is configured not to move for zooming and performs imaging effect. In the present embodiment, the fourth lens unit L4 forms the intermediate lens group. The lens configurations of the lens units are the same as those in Numerical Embodiment 1.

Table 1 shows numerical values in the conditional expressions for the present embodiment. The present embodiment satisfies Expressions (1), (2), (4) to (6). Since the movement loci of the second lens unit and the third lens unit are appropriately set, the zoom lens of the present embodiment favorably corrects the aberrations over the entire zoom range, achieving both high optical performance and reduction in size and weight.

Embodiment 3

Figure 5:
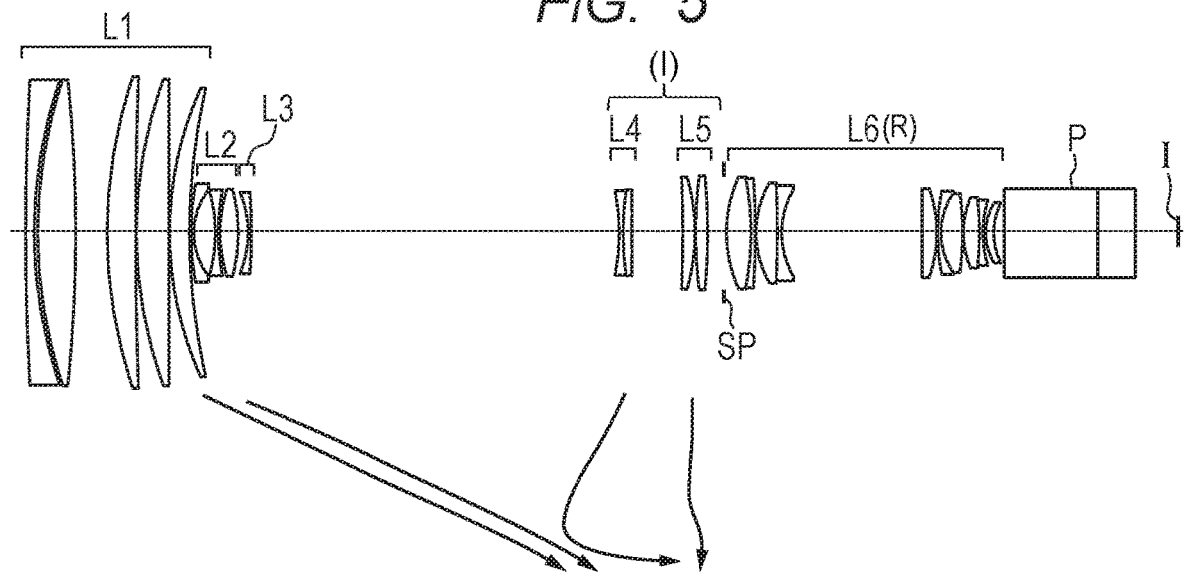
FIG. 5 is a lens sectional diagram of a zoom lens according to Numerical Embodiment 3 at the wide angle end, focused at infinity.
Figure 6A:
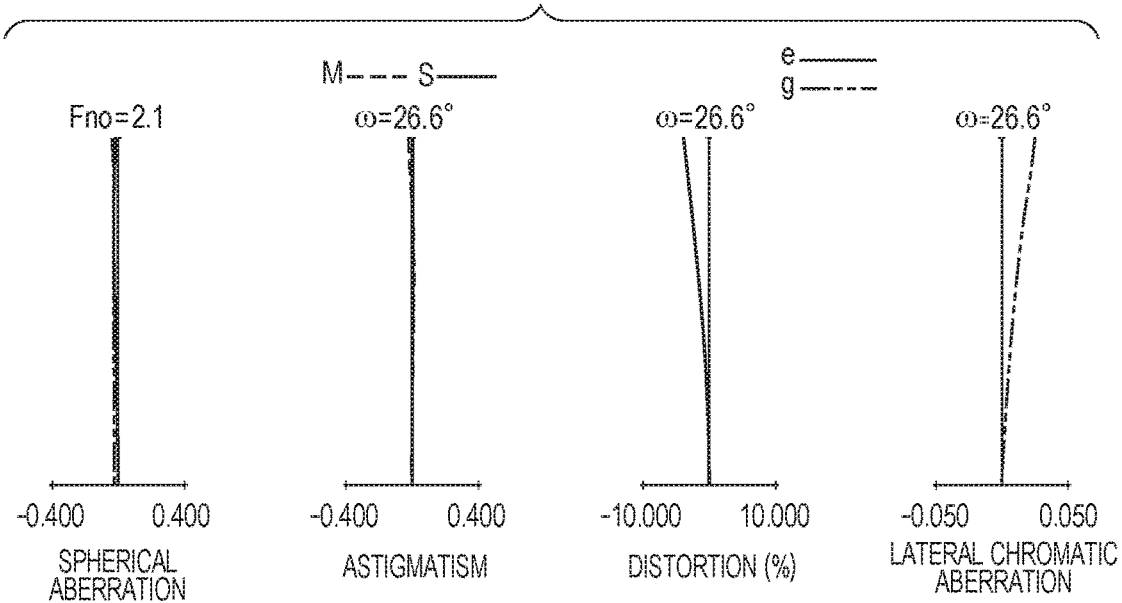
FIG. 6A is an aberration diagram of the zoom lens according to Numerical Embodiment 3 at the wide angle end, focused at infinity.

FIG. 5 is a lens sectional diagram of a zoom lens of Embodiment 3 (Numerical Embodiment 3) of the present invention at the wide angle end, focused at infinity. FIGS. 6A, 6B, 6C, and 6D are longitudinal aberration diagrams of the zoom lens of Numerical Embodiment 3 at the wide angle end, the focal length of 145.5 mm (fw×$Z^{0.7}$), the focal length of 304.3 mm (fw×$Z^{0.9}$), and the telephoto end, respectively. The zoom lens is focused at infinity in all the longitudinal aberration diagrams. The focal length of 145.5 mm is a zoom position where the distance between the second lens unit and the third lens unit is at the maximum in the range from fw×$Z^{0.7}$ to fw×$Z^{0.9}$.

The zoom lens in FIG. 5 includes, in order from the object side, a first lens unit L1 for focusing which has a positive refractive power, a second lens unit L2 for zooming and a third lens unit L3 which have negative refractive powers and move to the image side for zooming from the wide angle end to the telephoto end, a fourth lens unit L4 and a fifth lens unit L5 which have a negative refractive power and a positive refractive power, respectively, and move on the optical axis nonlinearly in conjunction with the movements of the second lens unit L2 and the third lens unit L3, and a sixth lens unit L6 which is configured not to move for zooming and performs imaging effect. In the present embodiment, the fourth lens unit L4 and the fifth lens unit L5 form the intermediate lens group.

Next, a description is given of the lens configurations of the lens units of the present embodiment. The first lens unit L1 corresponds to the first to tenth surfaces, the second lens unit L2 the 11th to 16th surfaces, the third lens unit L3 the 17th to 18th surfaces, the fourth lens unit L4 the 19th to 21st surfaces, the fifth lens unit L5 the 22nd to 25th surfaces, and the sixth lens unit L6 the 27th to 42nd surfaces. The second lens unit L2 includes a total of three convex and concave lenses, and the third lens unit L3 includes one concave lens.

Table 1 shows numerical values in the conditional expressions for the present embodiment. The present embodiment satisfies Expressions (1), (2), (4) to (6). Since the movement loci of the second lens unit and the third lens unit are appropriately set, the zoom lens of the present embodiment favorably corrects the aberrations over the entire zoom range, achieving both high optical performance and reduction in size and weight.

Embodiment 4

Figure 7:
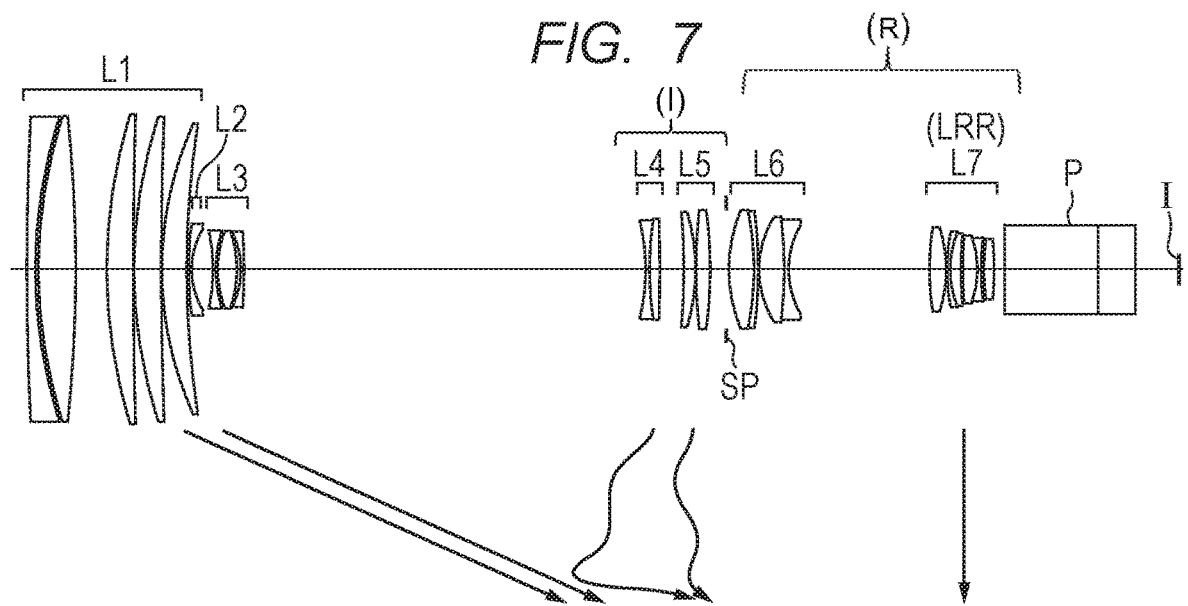
FIG. 7 is a lens sectional diagram of a zoom lens according to Numerical Embodiment 4 at the wide angle end, focused at infinity.
Figure 8A:
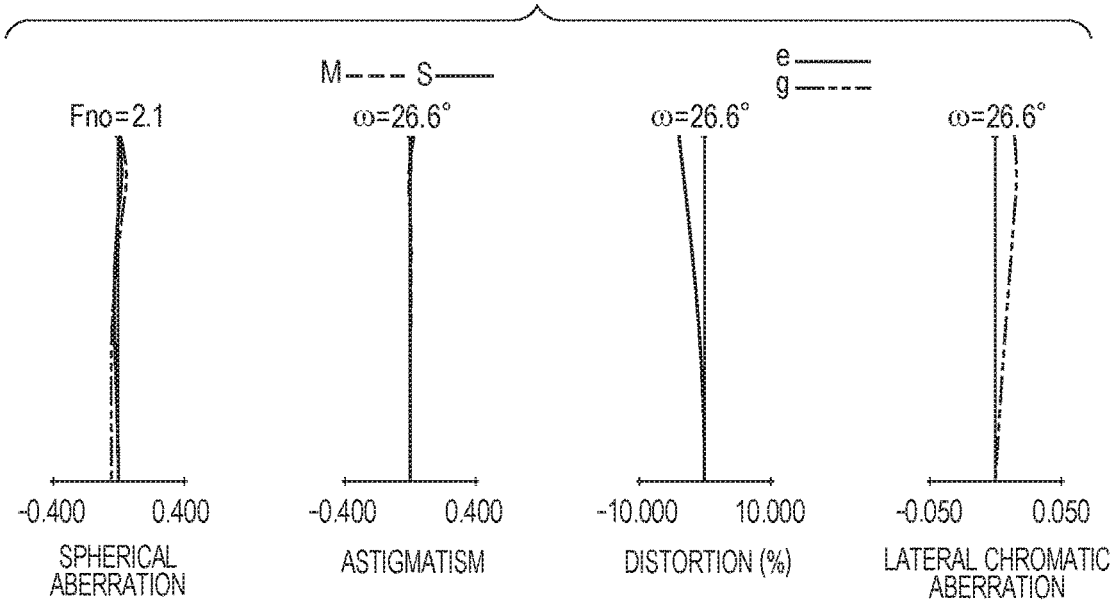
FIG. 8A is an aberration diagram of the zoom lens according to Numerical Embodiment 4 at the wide angle end, focused at infinity.
Figure 8B:
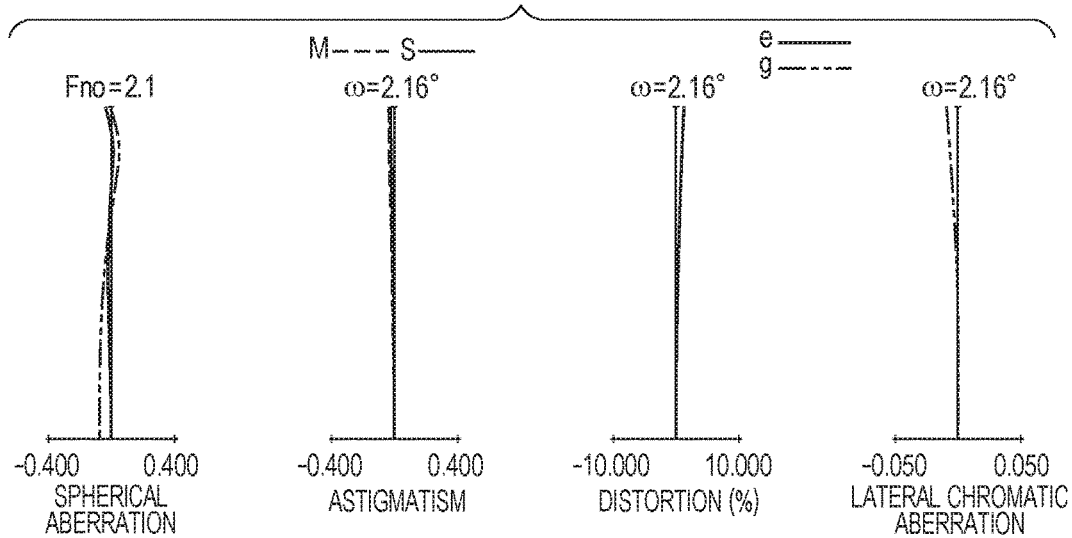
FIG. 8B is an aberration diagram of the zoom lens according to Numerical Embodiment 4 at f=145.5 mm, focused at infinity.
Figure 8C:
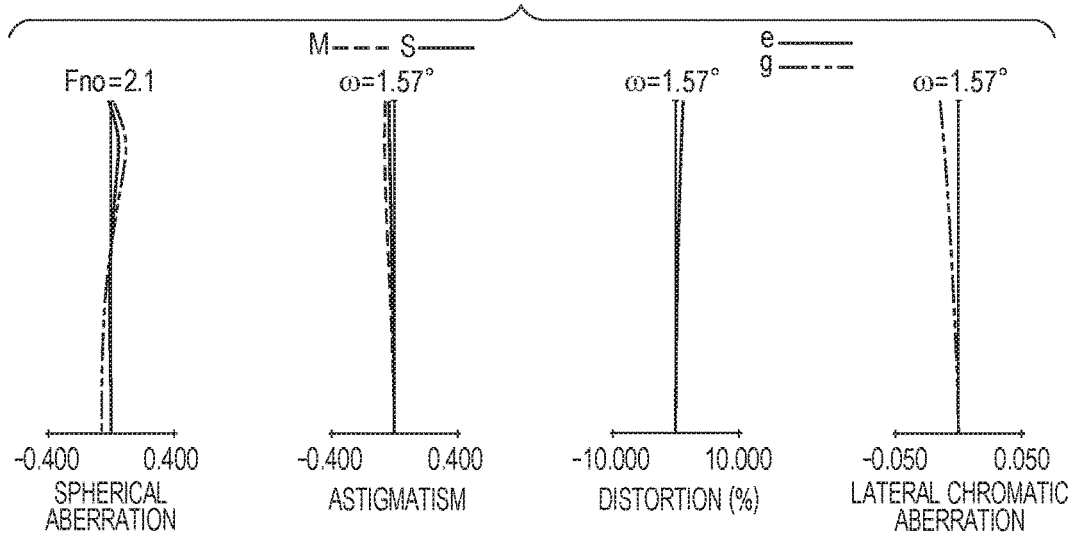
FIG. 8C is an aberration diagram of the zoom lens according to Numerical Embodiment 4 at f=200.5 mm, focused at infinity.
Figure 8D:
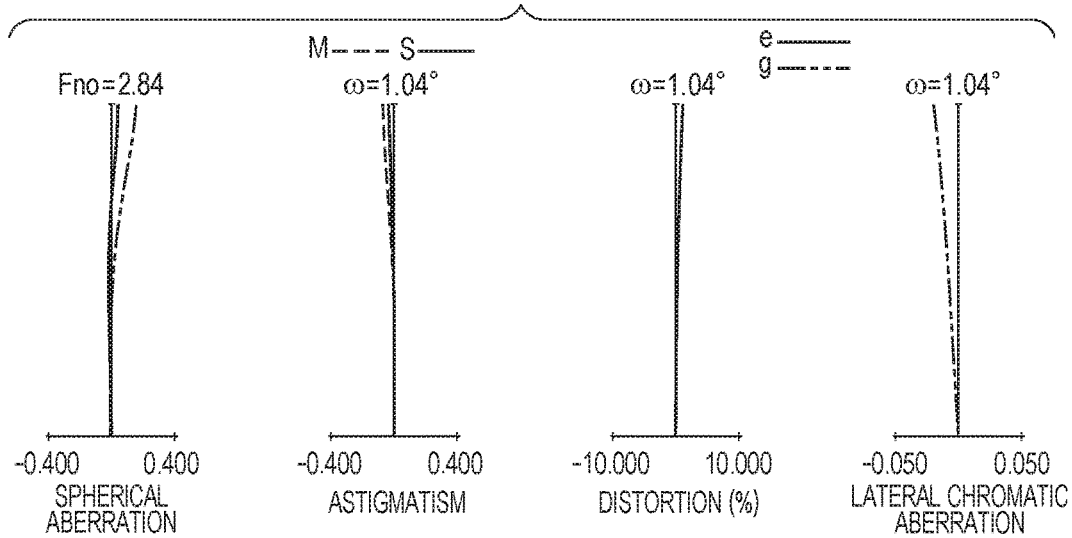
FIG. 8D is an aberration diagram of the zoom lens according to Numerical Embodiment 4 at f=304.3 mm, focused at infinity.
Figure 8E:
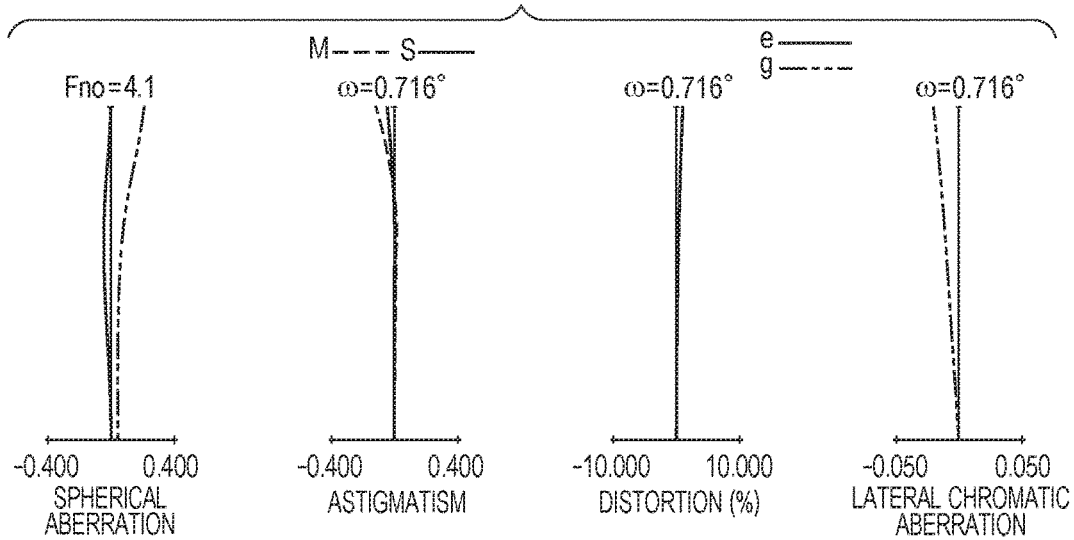
FIG. 8E is an aberration diagram of the zoom lens according to Numerical Embodiment 4 at the telephoto end, focused at infinity.

FIG. 7 is a lens sectional diagram of a zoom lens of Embodiment 4 (Numerical Embodiment 4) of the present invention at the wide angle end, focused at infinity. FIGS. 8A, 8B, 8C, 8D, and 8E are longitudinal aberration diagrams of the zoom lens of Numerical Embodiment 4 at the wide angle end, the focal length of 145.5 mm (fw×$Z^{0.7}$), the focal length of 200.5 mm (a zoom position where the distance between the second lens unit and the third lens unit is at the maximum in the range from fw×$Z^{0.7}$ to fw×$Z^{0.9}$), the focal length of 304.3 mm (fw×$Z^{0.9}$), and the telephoto end, respectively. The zoom lens is focused at infinity in all the longitudinal aberration diagrams. The focal length of 200.5 mm is a zoom position where the distance between the second lens unit and the third lens unit is at the maximum in the range from fw×$Z^{0.7}$ to fw×$Z^{0.9}$.

The zoom lens in FIG. 7 includes, in order from the object side, a first lens unit L1 for focusing which has a positive refractive power, a second lens unit L2 for zooming and a third lens unit L3 which have negative refractive powers and move to the image side for zooming from the wide angle end to the telephoto end, a fourth lens unit L4 and a fifth lens unit L5 which have a negative refractive power and a positive refractive power, respectively, and move on the optical axis nonlinearly in conjunction with the movements of the second lens unit L2 and the third lens unit L3, a sixth lens unit L6 which is configured not to move for zooming, and a seventh lens unit L7 which is configured to move for zooming. In the present embodiment, the fourth lens unit L4 and the fifth lens unit L5 form the intermediate lens group, and the sixth lens unit L6 and the seventh lens unit L7 form the rear lens group. Further, the seventh lens unit L7 corresponds to the lens unit LRR which is part of the rear lens group.

Next, a description is given of the lens configurations of the lens units of the present embodiment. The first lens unit L1 corresponds to the first to tenth surfaces, the second lens unit L2 the 11th to 12th surfaces, the third lens unit L3 the 13th to 18th surfaces, the fourth lens unit L4 the 19th to 21st surfaces, the fifth lens unit L5 the 22nd to 25th surfaces, the sixth lens unit L6 the 27th to 32nd surfaces, and the seventh lens unit L7 the 33rd to 42nd surfaces. The second lens unit L2 includes one concave lens, and the third lens unit L3 includes a total of three convex and concave lenses.

Table 1 shows numerical values in the conditional expressions for the present embodiment. The present embodiment satisfies Expressions (1) to (6). Since the movement loci of the second lens unit and the third lens unit are appropriately set, the zoom lens of the present embodiment favorably corrects the aberrations over the entire zoom range, achieving both high optical performance and reduction in size and weight.

Embodiment 5

Figure 9:
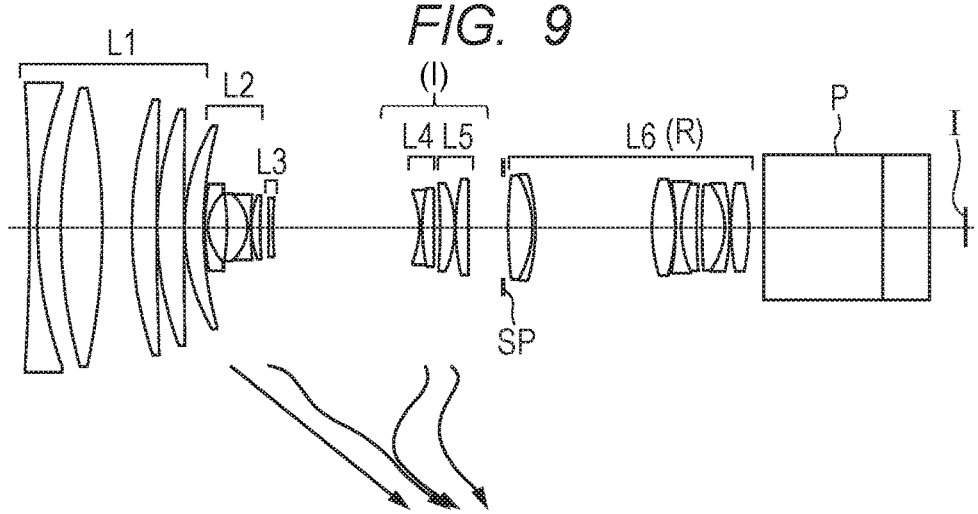
FIG. 9 is a lens sectional diagram of a zoom lens according to Numerical Embodiment 5 at the wide angle end, focused at infinity.
Figure 10A:
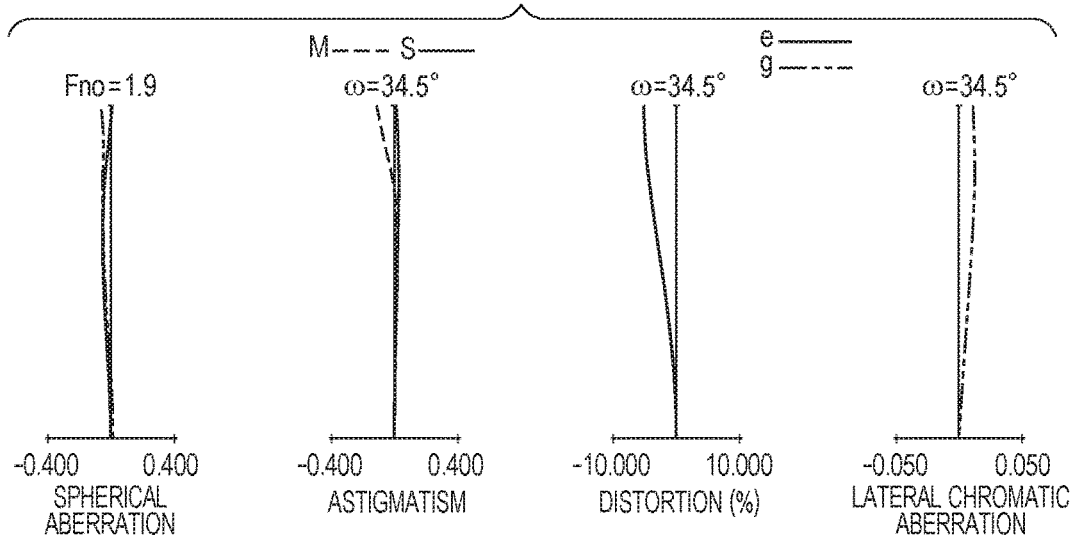
FIG. 10A is an aberration diagram of the zoom lens according to Numerical Embodiment 5 at the wide angle end, focused at infinity.
Figure 10B:
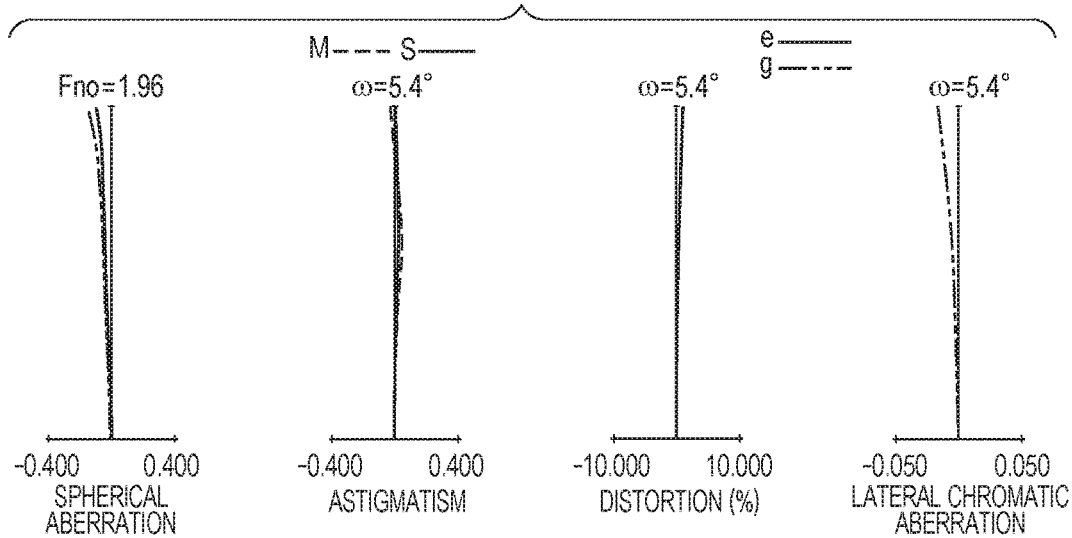
FIG. 10B is an aberration diagram of the zoom lens according to Numerical Embodiment 5 at f=58.1 mm, focused at infinity.
Figure 10C:
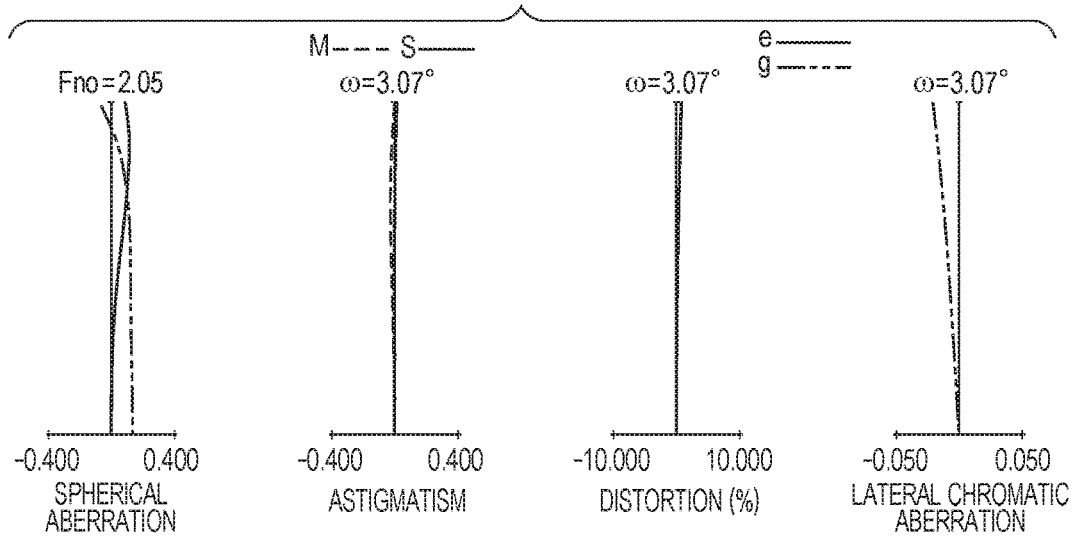
FIG. 10C is an aberration diagram of the zoom lens according to Numerical Embodiment 5 at f=102.4 mm, focused at infinity.
Figure 10D:
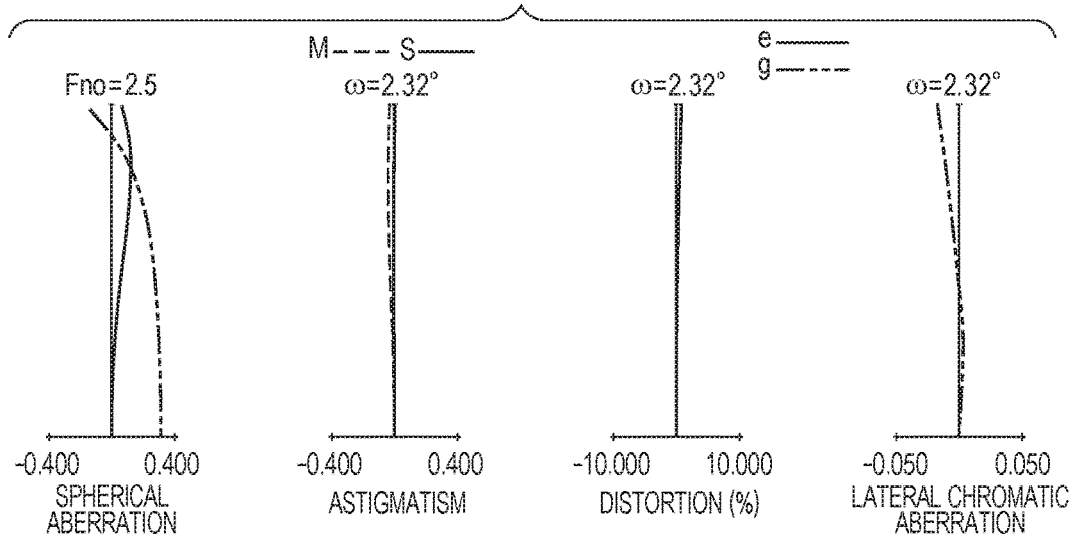
FIG. 10D is an aberration diagram of the zoom lens according to Numerical Embodiment 5 at the telephoto end, focused at infinity.

FIG. 9 is a lens sectional diagram of a zoom lens of Embodiment 5 (Numerical Embodiment 5) of the present invention at the wide angle end, focused at infinity. FIGS. 10A, 10B, 10C, and 10D are longitudinal aberration diagrams of the zoom lens of Numerical Embodiment 5 at the wide angle end, the focal length of 58.1 mm (fw×$Z^{0.7}$), the focal length of 102.44 mm (fw×$Z^{0.9}$), and the telephoto end, respectively. The zoom lens is focused at infinity in all the longitudinal aberration diagrams. The focal length of 102.44 mm is a zoom position where the distance between the second lens unit and the third lens unit is at the maximum in the range from fw×$Z^{0.7}$ to fw×$Z^{0.9}$.

The zoom lens in FIG. 9 includes, in order from the object side, a first lens unit L1 for focusing which has a positive refractive power, a second lens unit L2 for zooming and a third lens unit L3 which have negative refractive powers and move to the image side for zooming from the wide angle end to the telephoto end, a fourth lens unit L4 and a fifth lens unit L5 which have a negative refractive power and a positive refractive power, respectively, and move on the optical axis nonlinearly in conjunction with the movements of the second lens unit L2 and the third lens unit L3, and a sixth lens unit L6 which is configured not to move for zooming and performs imaging effect. In the present embodiment, the fourth lens unit L4 and the fifth lens unit L5 form the intermediate lens group.

Next, a description is given of the lens configurations of the lens units of the present embodiment. The first lens unit L1 corresponds to the first to tenth surfaces, the second lens unit L2 the 11th to 17th surfaces, the third lens unit L3 the 18th to 19th surfaces, the fourth lens unit L4 the 20th to 22nd surfaces, the fifth lens unit L5 the 23rd to 26th surfaces, and the sixth lens unit L6 the 28th to 40th surfaces. The second lens unit L2 includes a total of four convex and concave lenses, and the third lens unit L3 includes one concave lens.

Table 1 shows numerical values in the conditional expressions for the present embodiment. The present embodiment satisfies Expressions (1), (2), (4) to (6). Since the movement loci of the second lens unit and the third lens unit are appropriately set, the zoom lens of the present embodiment favorably corrects the aberrations over the entire zoom range, achieving both high optical performance and reduction in size and weight.

Embodiment 6

Figure 11:
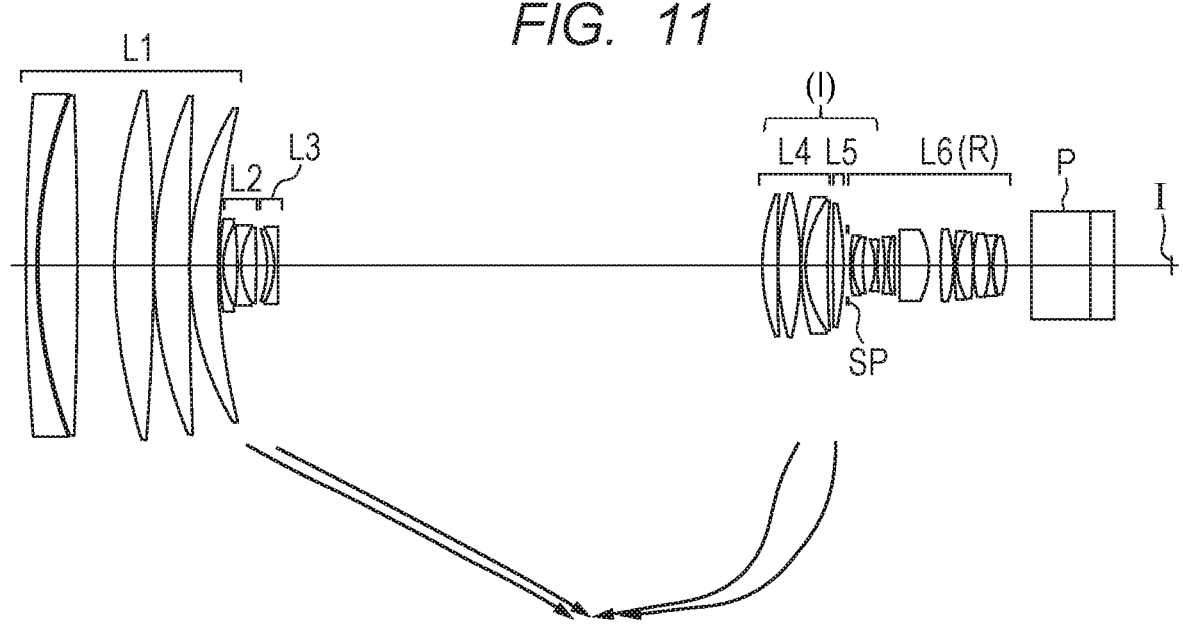
FIG. 11 is a lens sectional diagram of a zoom lens according to Numerical Embodiment 6 at the wide angle end, focused at infinity.
Figure 12A:
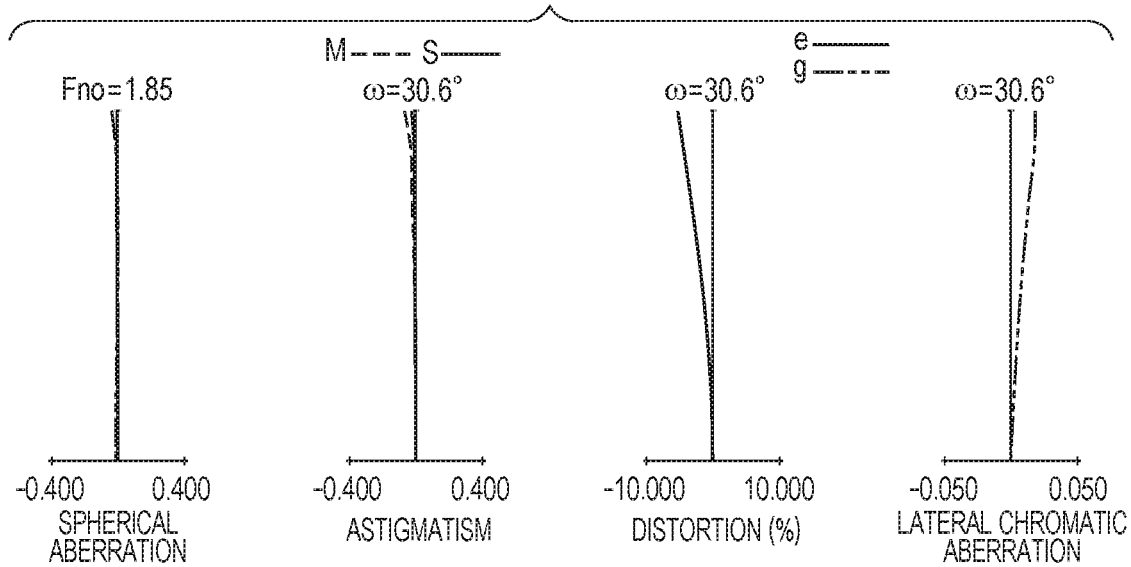
FIG. 12A is an aberration diagram of the zoom lens according to Numerical Embodiment 6 at the wide angle end, focused at infinity.
Figure 12B:
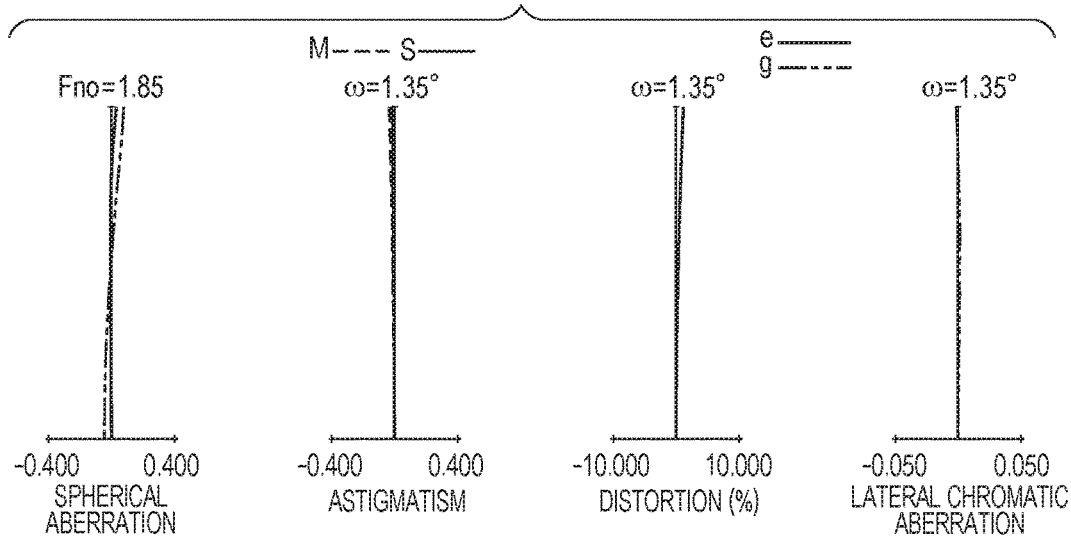
FIG. 12B is an aberration diagram of the zoom lens according to Numerical Embodiment 6 at f=233.6 mm, focused at infinity.
Figure 12C:
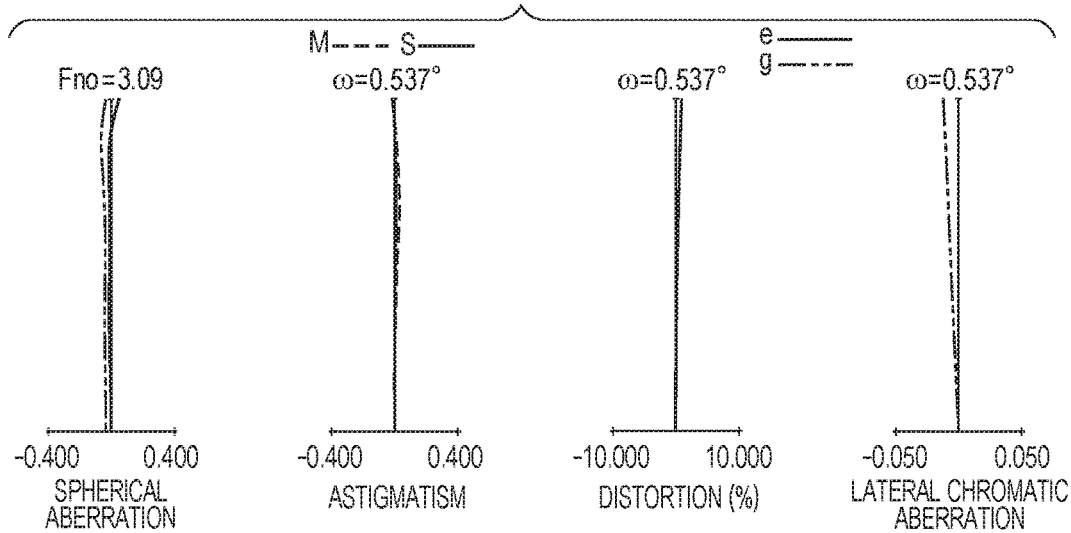
FIG. 12C is an aberration diagram of the zoom lens according to Numerical Embodiment 6 at f=586.8 mm, focused at infinity.
Figure 12D:
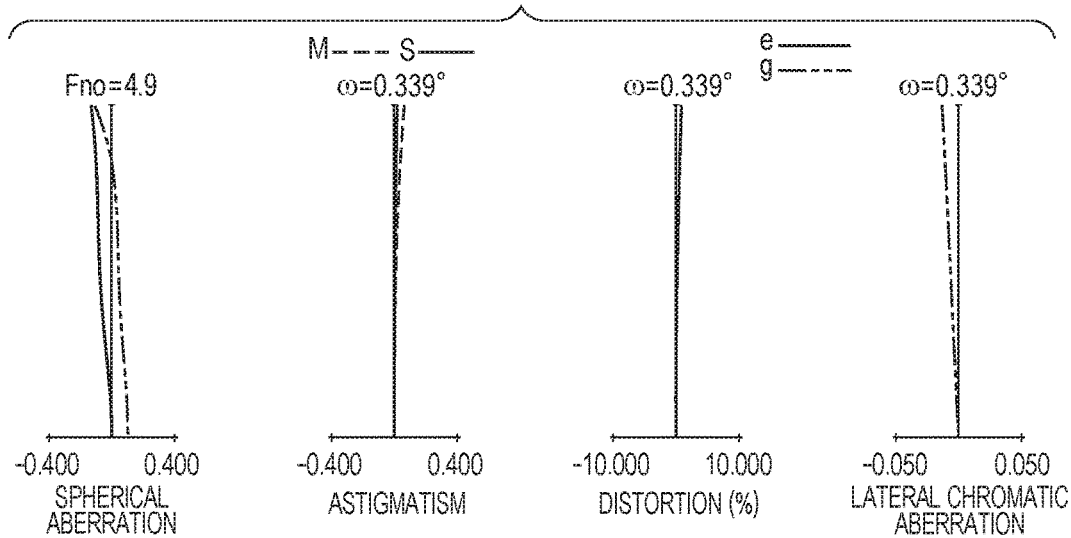
FIG. 12D is an aberration diagram of the zoom lens according to Numerical Embodiment 6 at the telephoto end, focused at infinity.

FIG. 11 is a lens sectional diagram of a zoom lens of Embodiment 6 (Numerical Embodiment 6) of the present invention at the wide angle end, focused at infinity. FIGS. 12A, 12B, 12C, and 12D are longitudinal aberration diagrams of the zoom lens of Numerical Embodiment 6 at the wide angle end, the focal length of 233.61 mm (fw×$Z^{0.7}$), the focal length of 586.8 mm (fw×$Z^{0.9}$), and the telephoto end, respectively. The zoom lens is focused at infinity in all the longitudinal aberration diagrams. The focal length of 233.61 mm is a zoom position where the distance between the second lens unit and the third lens unit is at the maximum in the range from fw×$Z^{0.7}$ to fw×$Z^{0.9}$.

The zoom lens in FIG. 11 includes, in order from the object side, a first lens unit L1 for focusing which has a positive refractive power, a second lens unit L2 for zooming and a third lens unit L3 which have negative refractive powers and move to the image side for zooming from the wide angle end to the telephoto end, a fourth lens unit L4 and a fifth lens unit L5 which have positive refractive powers and move on the optical axis nonlinearly in conjunction with the movements of the second lens unit L2 and the third lens unit L3, and a sixth lens unit L6 which is configured not to move for zooming and performs imaging effect. In the present embodiment, the fourth lens unit L4 and the fifth lens unit L5 form the intermediate lens group.

Next, a description is given of the lens configurations of the lens units of the present embodiment. The first lens unit L1 corresponds to the first to tenth surfaces, the second lens unit L2 the 11th to 15th surfaces, the third lens unit L3 the 16th to 18th surfaces, the fourth lens unit L4 the 19th to 25th surfaces, the fifth lens unit L5 the 26th to 27th surfaces, and the sixth lens unit L6 the 29th to 49th surfaces. The second lens unit L2 includes a total of three convex and concave lenses, and the third lens unit L3 includes a total of two convex and concave lenses.

Table 1 shows numerical values in the conditional expressions for the present embodiment. The present embodiment satisfies Expressions (1), (2), (4) to (6). Since the movement loci of the second lens unit and the third lens unit are appropriately set, the zoom lens of the present embodiment favorably corrects the aberrations over the entire zoom range, achieving both high optical performance and reduction in size and weight.

Numerical Embodiment 1

[unit: mm]

Surface data

| Surface number i | ri | di | ndi | vdi | Effective diameter |
|---|---|---|---|---|---|
| 1 | 824.902 | 3.00 | 1.80610 | 40.9 | 107.32 |
| 2 | 158.319 | 1.21 | | | 106.70 |
| 3 | 162.063 | 14.06 | 1.43387 | 95.1 | 107.26 |
| 4 | −466.625 | 10.91 | | | 107.48 |
| 5 | 168.657 | 9.04 | 1.43387 | 95.1 | 109.12 |
| 6 | 820.944 | 0.20 | | | 108.84 |
| 7 | 148.539 | 12.09 | 1.43387 | 95.1 | 107.43 |
| 8 | −5912.120 | 0.20 | | | 106.81 |
| 9 | 123.587 | 6.47 | 1.43387 | 95.1 | 101.03 |
| 10 | 216.650 | (variable) | | | 100.08 |
| 11 | 86.066 | 1.00 | 1.85150 | 40.8 | 33.55 |
| 12 | 24.362 | 7.51 | | | 29.40 |
| 13 | −48.305 | 0.90 | 1.81600 | 46.6 | 29.22 |
| 14 | 71.499 | 0.70 | | | 29.21 |
| 15 | 49.278 | 6.33 | 1.80810 | 22.8 | 29.74 |
| 16 | −55.053 | (variable) | | | 29.54 |
| 17 | −37.373 | 1.10 | 1.81600 | 46.6 | 27.78 |
| 18* | −188.072 | (variable) | | | 27.85 |
| 19 | −54.569 | 1.30 | 1.77250 | 49.6 | 28.42 |
| 20 | 76.386 | 3.58 | 1.84666 | 23.8 | 29.97 |
| 21 | −2973.776 | (variable) | | | 30.58 |
| 22(stop) | ∞ | 1.00 | | | 38.13 |
| 23 | 161.111 | 6.57 | 1.60738 | 56.8 | 39.36 |
| 24 | −69.560 | 0.15 | | | 39.94 |
| 25 | 324.619 | 4.43 | 1.51823 | 58.9 | 40.02 |
| 26 | −111.651 | 0.35 | | | 39.97 |
| 27 | 51.937 | 8.26 | 1.48749 | 70.2 | 38.58 |
| 28 | −74.253 | 1.50 | 1.83400 | 37.2 | 37.70 |
| 29 | 455.597 | 0.15 | | | 36.73 |
| 30 | 31.698 | 7.46 | 1.48749 | 70.2 | 34.97 |
| 31 | 929.268 | 1.50 | 1.88300 | 40.8 | 33.45 |
| 32 | 31.618 | 50.00 | | | 30.74 |
| 33 | 73.343 | 5.68 | 1.57501 | 41.5 | 30.39 |
| 34 | −56.462 | 0.20 | | | 30.07 |
| 35 | 194.336 | 1.20 | 1.81600 | 46.6 | 28.36 |
| 36 | 68.964 | 3.34 | 1.51742 | 52.4 | 27.53 |
| 37 | 1844.233 | 0.20 | | | 26.74 |
| 38 | 30.899 | 6.42 | 1.49700 | 81.5 | 25.03 |
| 39 | −57.977 | 1.20 | 1.88300 | 40.8 | 23.21 |
| 40 | 36.665 | 2.00 | | | 21.52 |
| 41 | 81.340 | 3.37 | 1.51823 | 58.9 | 21.47 |
| 42 | −221.688 | 3.80 | | | 21.16 |
| 43 | ∞ | 33.00 | 1.60859 | 46.4 | 31.25 |
| 44 | ∞ | 13.20 | 1.51680 | 64.2 | 31.25 |
| 45 | ∞ | 8.90 | | | 31.25 |
| Image plane | ∞ | | | | |

[unit: mm]

Aspheric surface data

18th surface

K = 6.06641e+001
A4 = 1.21406e−006
A6 = 1.81961e−009
A8 = 1.60180e−012

Various data
Zoom ratio 40.00

| | | | | |
|---|---|---|---|---|
| Focal length | 11.00 | 145.49 | 304.26 | 440.00 |
| F-number | 2.10 | 2.10 | 2.84 | 4.10 |
| Half angle of view | 26.57 | 2.16 | 1.04 | 0.72 |
| Image height | 5.50 | 5.50 | 5.50 | 5.50 |
| Total lens length | 389.79 | 389.79 | 389.79 | 389.79 |
| BF | 8.90 | 8.90 | 8.90 | 8.90 |
| d10 | 0.48 | 108.23 | 118.84 | 121.91 |
| d16 | 3.16 | 5.70 | 3.97 | 3.02 |
| d18 | 129.16 | 3.50 | 9.46 | 19.61 |
| d21 | 13.52 | 28.90 | 14.06 | 1.79 |
| Entrance pupil position | 77.38 | 984.05 | 1760.39 | 2251.60 |
| Exit pupil position | −689.71 | −689.71 | −689.71 | −689.71 |
| Front principal point position | 88.21 | 1099.24 | 1932.13 | 2414.48 |
| Rear principal point position | −2.10 | −136.59 | −295.36 | −431.10 |

Zoom lens unit data

| Unit | Start surface | Focal length | Lens structure length | Front principal point position | Rear principal point position |
|---|---|---|---|---|---|
| 1 | 1 | 161.84 | 57.18 | 31.47 | −10.81 |
| 2 | 11 | −56.13 | 16.43 | −5.67 | −21.29 |
| 3 | 17 | −57.06 | 1.10 | −0.15 | −0.76 |
| 4 | 19 | −77.62 | 4.88 | −0.12 | −2.78 |
| 5 | 22 | 69.73 | 154.97 | 61.88 | −139.90 |

Numerical Embodiment 2

[unit: mm]

Surface data

| Surface number i | ri | di | ndi | vdi | Effective diameter |
|---|---|---|---|---|---|
| 1 | 793.443 | 3.00 | 1.80610 | 40.9 | 107.32 |
| 2 | 154.155 | 1.00 | | | 106.67 |
| 3 | 154.310 | 14.61 | 1.43387 | 95.1 | 107.25 |
| 4 | −459.024 | 10.89 | | | 107.46 |
| 5 | 177.864 | 8.58 | 1.43387 | 95.1 | 108.92 |
| 6 | 845.646 | 0.20 | | | 108.66 |
| 7 | 156.955 | 8.87 | 1.43387 | 95.1 | 107.41 |
| 8 | 601.578 | 0.20 | | | 106.83 |
| 9 | 133.153 | 9.97 | 1.43387 | 95.1 | 103.57 |
| 10 | 622.166 | (variable) | | | 102.73 |

-continued

[unit: mm]

| | | | | | |
|---|---|---|---|---|---|
| 11 | 1276.681 | 1.00 | 1.85150 | 40.8 | 30.55 |
| 12 | 21.326 | 6.59 | | | 26.57 |
| 13 | −61.603 | 0.90 | 1.81600 | 46.6 | 26.54 |
| 14 | 2441.976 | 0.70 | | | 26.92 |
| 15 | 59.038 | 6.26 | 1.80810 | 22.8 | 27.63 |
| 16 | −37.640 | (variable) | | | 27.53 |
| 17 | −32.623 | 1.10 | 1.83481 | 42.7 | 24.83 |
| 18* | 264.759 | (variable) | | | 24.75 |
| 19 | −57.004 | 1.30 | 1.69680 | 55.5 | 35.20 |
| 20 | 119.202 | 3.58 | 1.84666 | 23.8 | 37.33 |
| 21 | −2847.323 | (variable) | | | 37.99 |
| 22(stop) | ∞ | 1.00 | | | 39.19 |
| 23 | 335.848 | 5.89 | 1.60738 | 56.8 | 40.16 |
| 24 | −65.292 | 0.15 | | | 40.80 |
| 25 | 97.925 | 6.23 | 1.51823 | 58.9 | 41.44 |
| 26 | −134.259 | 0.35 | | | 41.26 |
| 27 | 59.252 | 8.29 | 1.48749 | 70.2 | 39.76 |
| 28 | −81.639 | 1.50 | 1.83400 | 37.2 | 38.70 |
| 29 | 197.726 | 0.15 | | | 37.59 |
| 30 | 31.205 | 8.33 | 1.48749 | 70.2 | 36.22 |
| 31 | −1181.610 | 1.50 | 1.88300 | 40.8 | 34.72 |
| 32 | 35.138 | 50.00 | | | 32.11 |
| 33 | 73.266 | 6.38 | 1.57501 | 41.5 | 31.54 |
| 34 | −56.068 | 0.20 | | | 31.12 |
| 35 | 82.153 | 1.20 | 1.81600 | 46.6 | 28.71 |
| 36 | 31.275 | 6.06 | 1.51742 | 52.4 | 27.14 |
| 37 | −164.680 | 0.20 | | | 26.08 |
| 38 | 80.201 | 5.97 | 1.49700 | 81.5 | 24.76 |
| 39 | −30.677 | 1.20 | 1.88300 | 40.8 | 23.04 |
| 40 | 70.986 | 2.00 | | | 21.81 |
| 41 | 26.025 | 3.51 | 1.51823 | 58.9 | 21.45 |
| 42 | 48.262 | 3.80 | | | 20.73 |
| 43 | ∞ | 33.00 | 1.60859 | 46.4 | 31.25 |
| 44 | ∞ | 13.20 | 1.51680 | 64.2 | 31.25 |
| 45 | ∞ | 8.90 | | | 31.25 |
| Image plane | ∞ | | | | |

Aspheric surface data

18th surface

K = 3.88016e+001
A4 = −4.96524e−006
A6 = −5.02500e−009
A8 = 2.51247e−013

Various data
Zoom ratio 40.00

| | | | | |
|---|---|---|---|---|
| Focal length | 11.00 | 145.49 | 304.26 | 440.00 |
| F-number | 2.10 | 2.10 | 2.84 | 4.10 |
| Half angle of view | 26.57 | 2.16 | 1.04 | 0.72 |
| Image height | 5.50 | 5.50 | 5.50 | 5.50 |
| Total lens length | 395.45 | 395.45 | 395.45 | 395.45 |
| BF | 8.90 | 8.90 | 8.90 | 8.90 |
| d10 | 1.12 | 110.91 | 121.12 | 124.11 |
| d16 | 2.94 | 4.19 | 4.46 | 4.67 |
| d18 | 141.84 | 6.85 | 8.45 | 17.12 |
| d21 | 1.80 | 25.74 | 13.66 | 1.79 |
| Entrance pupil position | 72.84 | 991.54 | 1761.78 | 2270.22 |
| Exit pupil position | −624.13 | −624.13 | −624.13 | −624.13 |
| Front principal point position | 83.65 | 1103.59 | 1919.80 | 2404.39 |
| Rear principal point position | −2.10 | −136.59 | −295.36 | −431.10 |

Zoom lens unit data

| Unit | Start surface | Focal length | Lens structure length | Front principal point position | Rear principal point position |
|---|---|---|---|---|---|
| 1 | 1 | 161.84 | 57.32 | 31.70 | −10.69 |
| 2 | 11 | −150.00 | 15.46 | −38.96 | −68.93 |
| 3 | 17 | −34.54 | 1.10 | 0.07 | −0.53 |
| 4 | 19 | −93.88 | 4.88 | −0.17 | −2.87 |
| 5 | 22 | 69.64 | 160.11 | 60.79 | −145.88 |

Numerical Embodiment 3

[unit: mm]
Surface data

| Surface number i | ri | di | ndi | vdi | Effective diameter |
|---|---|---|---|---|---|
| 1 | 957.775 | 3.00 | 1.80610 | 40.9 | 107.32 |
| 2 | 162.368 | 1.23 | | | 106.79 |
| 3 | 166.431 | 13.56 | 1.43387 | 95.1 | 107.35 |
| 4 | −512.273 | 11.01 | | | 107.58 |
| 5 | 168.959 | 10.13 | 1.43387 | 95.1 | 109.60 |
| 6 | 1495.081 | 0.20 | | | 109.31 |
| 7 | 154.612 | 11.65 | 1.43387 | 95.1 | 107.73 |
| 8 | 38839.726 | 0.20 | | | 107.04 |
| 9 | 122.556 | 7.02 | 1.43387 | 95.1 | 101.45 |
| 10 | 225.674 | (variable) | | | 100.41 |
| 11 | 88.441 | 1.00 | 1.85150 | 40.8 | 34.60 |
| 12 | 24.699 | 7.72 | | | 30.25 |
| 13 | −51.946 | 0.90 | 1.81600 | 46.6 | 30.07 |
| 14 | 72.344 | 0.70 | | | 30.03 |
| 15 | 49.970 | 6.54 | 1.80810 | 22.8 | 30.55 |
| 16 | −55.423 | (variable) | | | 30.34 |
| 17 | −36.505 | 1.10 | 1.81600 | 46.6 | 28.36 |
| 18* | −195.032 | (variable) | | | 28.46 |
| 19 | −67.953 | 1.30 | 1.77250 | 49.6 | 28.54 |
| 20 | 99.252 | 3.21 | 1.84666 | 23.8 | 29.65 |
| 21 | −2050.578 | (variable) | | | 30.17 |
| 22 | −396.308 | 4.27 | 1.60738 | 56.8 | 38.57 |
| 23 | −71.051 | 0.15 | | | 39.22 |
| 24 | 148.116 | 4.32 | 1.51823 | 58.9 | 39.99 |
| 25 | −208.979 | (variable) | | | 40.04 |
| 26(stop) | ∞ | 1.00 | | | 39.64 |
| 27 | 46.637 | 8.82 | 1.48749 | 70.2 | 39.30 |
| 28 | −94.064 | 1.50 | 1.83400 | 37.2 | 38.45 |
| 29 | −259.814 | 0.15 | | | 37.92 |
| 30 | 34.514 | 7.64 | 1.48749 | 70.2 | 35.17 |
| 31 | −361.353 | 1.50 | 1.88300 | 40.8 | 33.45 |
| 32 | 30.145 | 50.00 | | | 30.35 |
| 33 | ∞ | 5.14 | 1.57501 | 41.5 | 31.16 |
| 34 | −45.674 | 0.20 | | | 31.19 |
| 35 | 68.946 | 1.20 | 1.81600 | 46.6 | 29.25 |
| 36 | 24.087 | 7.80 | 1.51742 | 52.4 | 27.55 |
| 37 | −89.159 | 0.20 | | | 26.92 |
| 38 | 30.821 | 5.69 | 1.49700 | 81.5 | 24.72 |
| 39 | −109.662 | 1.20 | 1.88300 | 40.8 | 23.04 |
| 40 | 37.479 | 1.00 | | | 21.45 |
| 41 | 20.136 | 2.86 | 1.51633 | 64.1 | 21.08 |
| 42 | 23.282 | 3.80 | | | 20.07 |
| 43 | ∞ | 33.00 | 1.60859 | 46.4 | 31.25 |
| 44 | ∞ | 13.20 | 1.51680 | 64.2 | 31.25 |

-continued

[unit: mm]

| | | | | |
|---|---|---|---|---|
| 45 | ∞ | 8.90 | | 31.25 |
| Image plane | ∞ | | | |

Aspheric surface data

18th surface

K = 1.10614e+001
A4 = −1.04495e−007
A6 = 1.49273e−009
A8 = −2.78561e−012

Various data
Zoom ratio 40.00

| | | | | |
|---|---|---|---|---|
| Focal length | 11.00 | 145.49 | 304.26 | 440.00 |
| F-number | 2.10 | 2.10 | 2.84 | 4.10 |
| Half angle of view | 26.57 | 2.16 | 1.04 | 0.72 |
| Image height | 5.50 | 5.50 | 5.50 | 5.50 |
| Total lens length | 402.32 | 402.32 | 402.32 | 402.32 |
| BF | 8.90 | 8.90 | 8.90 | 8.90 |
| d10 | 0.50 | 108.67 | 118.69 | 121.55 |
| d16 | 3.44 | 7.30 | 4.50 | 3.18 |
| d18 | 130.73 | 2.99 | 14.30 | 27.41 |
| d21 | 18.04 | 37.57 | 17.39 | 1.80 |
| d25 | 5.61 | 1.79 | 3.44 | 4.38 |
| Entrance pupil position | 78.83 | 1100.87 | 2072.39 | 2756.36 |
| Exit pupil position | −362.70 | −362.70 | −362.70 | −362.70 |
| Front principal point position | 89.50 | 1189.40 | 2127.53 | 2675.36 |
| Rear principal point position | −2.10 | −136.59 | −295.36 | −431.10 |

Zoom lens unit data

| Unit | Start surface | Focal length | Lens structure length | Front principal point position | Rear principal point position |
|---|---|---|---|---|---|
| 1 | 1 | 161.84 | 58.00 | 32.10 | −10.67 |
| 2 | 11 | −60.57 | 16.86 | −6.72 | −23.06 |
| 3 | 17 | −54.93 | 1.10 | −0.14 | −0.75 |
| 4 | 19 | −98.10 | 4.51 | −0.16 | −2.62 |
| 5 | 22 | 76.77 | 8.74 | 3.57 | −2.08 |
| 6 | 26 | 85.10 | 145.90 | 66.14 | −65.90 |

Numerical Embodiment 4

[unit: mm]

Surface data

| Surface number i | ri | di | ndi | vdi | Effective diameter |
|---|---|---|---|---|---|
| 1 | 1048.292 | 3.00 | 1.80610 | 40.9 | 107.32 |
| 2 | 171.892 | 1.02 | | | 106.85 |
| 3 | 172.183 | 13.29 | 1.43387 | 95.1 | 107.37 |
| 4 | −504.624 | 10.94 | | | 107.58 |
| 5 | 181.778 | 9.37 | 1.43387 | 95.1 | 109.13 |
| 6 | 1837.612 | 0.20 | | | 108.88 |
| 7 | 169.002 | 9.75 | 1.43387 | 95.1 | 107.44 |
| 8 | 1453.341 | 0.20 | | | 106.80 |
| 9 | 123.713 | 8.72 | 1.43387 | 95.1 | 102.32 |
| 10 | 326.920 | (variable) | | | 101.40 |
| 11* | 142.404 | 1.00 | 1.90366 | 31.3 | 32.09 |
| 12 | 27.189 | (variable) | | | 28.54 |
| 13 | −61.256 | 0.90 | 1.81600 | 46.6 | 27.28 |
| 14 | 43.006 | 0.70 | | | 26.81 |
| 15 | 38.788 | 6.78 | 1.80810 | 22.8 | 27.19 |
| 16 | −40.973 | 1.46 | | | 26.90 |
| 17 | −28.420 | 1.10 | 1.81600 | 46.6 | 26.43 |
| 18 | −188.867 | (variable) | | | 26.60 |
| 19 | −66.394 | 1.30 | 1.77250 | 49.6 | 33.16 |
| 20 | 111.810 | 3.60 | 1.84666 | 23.8 | 34.73 |
| 21 | −810.403 | (variable) | | | 35.35 |
| 22 | −232.668 | 4.18 | 1.60738 | 56.8 | 39.58 |
| 23 | −68.053 | 0.15 | | | 40.35 |
| 24 | 187.852 | 5.04 | 1.51823 | 58.9 | 41.47 |
| 25 | −147.895 | (variable) | | | 41.69 |
| 26(stop) | ∞ | 1.00 | | | 41.61 |
| 27 | 52.470 | 8.94 | 1.48749 | 70.2 | 41.56 |
| 28 | −97.136 | 1.50 | 1.88300 | 40.8 | 40.85 |
| 29 | −147.088 | 0.15 | | | 40.56 |
| 30 | 34.301 | 9.05 | 1.48749 | 70.2 | 36.98 |
| 31 | −139.586 | 1.50 | 1.83400 | 37.2 | 35.09 |
| 32 | 31.290 | (variable) | | | 31.45 |
| 33 | 92.165 | 5.96 | 1.57501 | 41.5 | 29.49 |
| 34 | −47.014 | 0.20 | | | 29.13 |
| 35 | 64.136 | 1.20 | 1.81600 | 46.6 | 26.52 |
| 36 | 34.197 | 3.93 | 1.51742 | 52.4 | 25.27 |
| 37 | 163.804 | 0.50 | | | 24.27 |
| 38 | 120.406 | 5.30 | 1.49700 | 81.5 | 23.81 |
| 39 | −31.687 | 1.20 | 1.88300 | 40.8 | 22.38 |
| 40 | 87.657 | 1.00 | | | 21.44 |
| 41 | 84.754 | 3.63 | 1.51823 | 58.9 | 21.20 |
| 42 | −99.458 | (variable) | | | 20.81 |
| 43 | ∞ | 33.00 | 1.60859 | 46.4 | 31.25 |
| 44 | ∞ | 13.20 | 1.51680 | 64.2 | 31.25 |
| 45 | ∞ | 8.90 | | | 31.25 |
| Image plane | ∞ | | | | |

Aspheric surface data

11th surface

K = 2.34652e+001
A4 = 1.00780e−006
A6 = −2.02900e−009
A8 = 8.13926e−012

Various data
Zoom ratio 40.00

| | | | | | |
|---|---|---|---|---|---|
| Focal length | 11.00 | 145.49 | 200.50 | 304.26 | 440.00 |
| F-number | 2.10 | 2.10 | 2.10 | 2.84 | 4.10 |
| Half angle of view | 26.56 | 2.16 | 1.57 | 1.04 | 0.72 |
| Image height | 5.50 | 5.50 | 5.50 | 5.50 | 5.50 |
| Total lens length | 401.74 | 401.74 | 401.74 | 401.74 | 401.74 |
| BF | 8.90 | 8.90 | 8.90 | 8.90 | 8.90 |
| d10 | 0.73 | 109.83 | 114.97 | 120.07 | 123.00 |
| d12 | 7.68 | 10.03 | 10.33 | 10.01 | 9.29 |
| d18 | 142.57 | 3.77 | 3.37 | 13.81 | 29.19 |
| d21 | 8.54 | 33.61 | 28.92 | 16.31 | 1.80 |
| d25 | 5.56 | 7.83 | 7.49 | 4.89 | 1.80 |
| d32 | 50.00 | 49.93 | 49.92 | 49.91 | 49.90 |

-continued

[unit: mm]

| | | | | | |
|---|---|---|---|---|---|
| d42 | 3.80 | 3.87 | 3.88 | 3.89 | 3.90 |
| Entrance pupil position | 74.92 | 1063.00 | 1411.24 | 2095.45 | 2868.06 |
| Exit pupil position | −407.11 | −404.60 | −404.22 | −403.83 | −403.59 |
| Front principal point position | 85.63 | 1157.30 | 1514.43 | 2175.41 | 2838.71 |
| Rear principal point position | −2.10 | −136.59 | −191.60 | −295.36 | −431.10 |

Zoom lens unit data

| Unit | Start surface | Focal length | Lens structure length | Front principal point position | Rear principal point position |
|---|---|---|---|---|---|
| 1 | 1 | 161.84 | 56.49 | 31.09 | −10.72 |
| 2 | 11 | −37.06 | 1.00 | 0.65 | 0.12 |
| 3 | 13 | −64.91 | 10.94 | 2.30 | −4.36 |
| 4 | 19 | −101.08 | 4.90 | −0.34 | −3.02 |
| 5 | 22 | 79.24 | 9.37 | 4.11 | −1.95 |
| 6 | 26 | 544.09 | 22.14 | −143.82 | −124.71 |
| 7 | 33 | 70.90 | 22.93 | −1.80 | −16.66 |
| 8 | 43 | ∞ | 46.20 | 14.58 | −14.58 |

Numerical Embodiment 5

[unit: mm]

Surface data

| Surface number i | ri | di | ndi | vdi | Effective diameter |
|---|---|---|---|---|---|
| 1 | −620.262 | 2.20 | 1.85478 | 24.8 | 80.08 |
| 2 | 110.247 | 6.47 | | | 76.66 |
| 3 | 138.334 | 11.72 | 1.49700 | 81.5 | 76.75 |
| 4 | −173.747 | 8.12 | | | 76.38 |
| 5 | 107.380 | 6.93 | 1.49700 | 81.5 | 70.61 |
| 6 | 751.089 | 0.15 | | | 69.59 |
| 7 | 90.356 | 7.54 | 1.59522 | 67.7 | 65.00 |
| 8 | 1878.500 | 0.15 | | | 63.76 |
| 9 | 55.069 | 5.21 | 1.76385 | 48.5 | 55.89 |
| 10 | 99.809 | (variable) | | | 54.70 |
| 11 | 57.480 | 0.90 | 1.88300 | 40.8 | 23.62 |
| 12 | 12.370 | 5.16 | | | 18.53 |
| 13 | −57.787 | 5.77 | 1.80810 | 22.8 | 18.36 |
| 14 | −11.575 | 0.80 | 1.88300 | 40.8 | 17.88 |
| 15 | 93.077 | 0.20 | | | 17.33 |
| 16 | 23.202 | 2.44 | 1.59551 | 39.2 | 17.30 |
| 17 | 110.151 | (variable) | | | 16.96 |
| 18 | −269.745 | 1.10 | 1.77250 | 49.6 | 16.16 |
| 19 | 70.665 | (variable) | | | 15.83 |
| 20 | −23.861 | 0.70 | 1.77250 | 49.6 | 18.39 |
| 21 | 45.892 | 3.30 | 1.84666 | 23.8 | 20.33 |
| 22 | −1110.861 | (variable) | | | 21.34 |
| 23 | −127.612 | 4.07 | 1.60311 | 60.6 | 22.84 |
| 24 | −28.636 | 0.15 | | | 24.05 |
| 25 | 54.966 | 3.56 | 1.51633 | 64.1 | 26.03 |
| 26* | 25521.363 | (variable) | | | 26.27 |
| 27(stop) | ∞ | 1.30 | | | 27.93 |
| 28 | 108.437 | 6.85 | 1.51742 | 52.4 | 28.36 |
| 29 | −27.766 | 0.90 | 1.88300 | 40.8 | 28.44 |
| 30 | −48.681 | 32.40 | | | 29.10 |
| 31 | 44.751 | 6.54 | 1.58913 | 61.1 | 26.53 |
| 32 | −42.387 | 0.20 | | | 25.84 |

-continued

[unit: mm]

| 33 | −57.451 | 1.40 | 1.83481 | 42.7 | 25.05 |
|---|---|---|---|---|---|
| 34 | 28.110 | 4.33 | 1.49700 | 81.5 | 23.72 |
| 35 | 140.859 | 1.50 | | | 23.51 |
| 36 | 160.081 | 6.44 | 1.51823 | 58.9 | 23.43 |
| 37 | −19.095 | 1.40 | 1.83400 | 37.2 | 23.25 |
| 38 | −51.774 | 0.20 | | | 23.99 |
| 39 | 56.543 | 5.16 | 1.51633 | 64.1 | 24.24 |
| 40 | −51.575 | 4.00 | | | 24.17 |
| 41 | ∞ | 33.00 | 1.60859 | 46.4 | 40.00 |
| 42 | ∞ | 13.20 | 1.51633 | 64.1 | 40.00 |
| 43 | ∞ | 8.90 | | | 40.00 |
| Image plane | ∞ | | | | |

Aspheric surface data

26th surface

K = −3.55603e+006
A4 = 4.90701e−007
A6 = 4.39091e−009
A8 = −4.52046e−011
A10 = 2.10063e−013
A12 = −3.56390e−016

Various data
Zoom ratio 17.00

| | | | | |
|---|---|---|---|---|
| Focal length | 8.00 | 58.13 | 102.44 | 136.00 |
| F-number | 1.90 | 1.96 | 2.05 | 2.50 |
| Half angle of view | 34.51 | 5.40 | 3.07 | 2.32 |
| Image height | 5.50 | 5.50 | 5.50 | 5.50 |
| Total lens length | 259.60 | 259.60 | 259.60 | 259.60 |
| BF | 8.90 | 8.90 | 8.90 | 8.90 |
| d10 | 0.41 | 37.60 | 42.28 | 43.86 |
| d17 | 2.44 | 2.45 | 3.27 | 3.31 |
| d19 | 40.97 | 4.06 | 3.94 | 4.51 |
| d22 | 1.79 | 6.37 | 3.89 | 1.79 |
| d26 | 9.63 | 4.78 | 1.86 | 1.78 |
| Entrance pupil position | 47.63 | 274.51 | 453.79 | 573.27 |
| Exit pupil position | −10976.85 | −10976.85 | −10976.85 | −10976.85 |
| Front principal point position | 55.62 | 332.33 | 555.27 | 707.59 |
| Rear principal point position | 0.90 | −49.23 | −93.54 | −127.10 |

Zoom lens unit data

| Unit | Start surface | Focal length | Lens structure length | Front principal point position | Rear principal point position |
|---|---|---|---|---|---|
| 1 | 1 | 61.00 | 48.49 | 30.71 | −0.58 |
| 2 | 11 | −15.02 | 15.26 | 1.06 | −9.88 |
| 3 | 18 | −72.04 | 1.10 | 0.49 | −0.13 |
| 4 | 20 | −33.37 | 4.00 | −0.08 | −2.26 |
| 5 | 23 | 38.24 | 7.78 | 3.01 | −1.98 |
| 6 | 27 | 51.54 | 118.82 | 51.30 | −62.98 |

Numerical Embodiment 6

[unit: mm]

Surface data

| Surface number i | ri | di | ndi | vdi | Effective diameter |
|---|---|---|---|---|---|
| 1 | 1090.019 | 6.00 | 1.83400 | 37.2 | 190.47 |
| 2 | 263.229 | 0.99 | | | 188.26 |
| 3 | 262.549 | 21.88 | 1.43387 | 95.1 | 188.89 |
| 4 | −2546.320 | 20.69 | | | 189.17 |
| 5 | 313.034 | 21.92 | 1.43387 | 95.1 | 194.07 |
| 6 | −1179.467 | 0.25 | | | 193.80 |
| 7 | 239.654 | 19.88 | 1.43387 | 95.1 | 188.43 |
| 8 | 2321.476 | 0.25 | | | 187.40 |
| 9 | 169.179 | 15.64 | 1.43875 | 94.9 | 174.63 |
| 10 | 338.870 | (variable) | | | 172.71 |
| 11 | 167.672 | 2.00 | 2.00330 | 28.3 | 51.47 |
| 12 | 45.036 | 7.98 | | | 45.20 |
| 13 | −183.633 | 2.00 | 1.88300 | 40.8 | 44.72 |
| 14 | 39.574 | 8.51 | 1.92286 | 18.9 | 41.78 |
| 15 | −554.774 | (variable) | | | 41.05 |
| 16 | −54.952 | 4.00 | 1.80810 | 22.8 | 39.63 |
| 17 | −40.823 | 2.00 | 1.81600 | 46.6 | 40.40 |
| 18* | 2688.085 | (variable) | | | 42.85 |
| 19 | 108.075 | 8.57 | 1.60311 | 60.6 | 78.51 |
| 20* | ∞ | 0.20 | | | 78.63 |
| 21 | 140.888 | 12.72 | 1.49700 | 81.5 | 79.70 |
| 22 | −162.124 | 0.20 | | | 79.58 |
| 23 | 132.175 | 2.50 | 1.85478 | 24.8 | 75.83 |
| 24 | 61.079 | 12.37 | 1.49700 | 81.5 | 71.83 |
| 25 | 498.838 | (variable) | | | 71.34 |
| 26* | 875.581 | 6.04 | 1.59522 | 67.7 | 68.68 |
| 27 | −155.291 | (variable) | | | 68.33 |
| 28(stop) | ∞ | 1.42 | | | 34.71 |
| 29 | 84.987 | 1.40 | 1.81600 | 46.6 | 32.95 |
| 30 | 29.740 | 0.20 | | | 30.90 |
| 31 | 32.169 | 5.57 | 1.84666 | 23.8 | 30.89 |
| 32 | 73.299 | 7.00 | | | 29.46 |
| 33 | −35.690 | 1.40 | 1.88300 | 40.8 | 28.15 |
| 34 | 221.173 | 4.00 | | | 28.90 |
| 35 | −96.973 | 1.80 | 1.75500 | 52.3 | 29.90 |
| 36 | 65.257 | 3.44 | 1.84666 | 23.8 | 31.75 |
| 37 | 317.904 | 3.03 | | | 32.37 |
| 38 | ∞ | 16.48 | 1.62041 | 60.3 | 34.29 |
| 39 | −41.309 | 6.47 | | | 39.28 |
| 40 | 207.729 | 7.42 | 1.48749 | 70.2 | 39.96 |
| 41 | −62.310 | 0.20 | | | 39.88 |
| 42 | 144.545 | 1.60 | 1.88300 | 40.8 | 38.03 |
| 43 | 36.283 | 9.05 | 1.48749 | 70.2 | 36.31 |
| 44 | −153.846 | 0.20 | | | 35.93 |
| 45 | 75.778 | 9.09 | 1.56732 | 42.8 | 34.93 |
| 46 | −51.249 | 1.60 | 1.88300 | 40.8 | 33.38 |
| 47 | 60.067 | 0.20 | | | 32.22 |
| 48 | 46.462 | 7.59 | 1.48749 | 70.2 | 32.37 |
| 49 | −51.977 | 14.00 | | | 32.08 |
| 50 | ∞ | 33.00 | 1.60859 | 46.4 | 60.00 |
| 51 | ∞ | 13.20 | 1.51633 | 64.2 | 60.00 |
| 52 | ∞ | 12.00 | | | 60.00 |
| Image plane | ∞ | | | | |

Aspheric surface data

18th surface

K = −3.28820e+004
A4 = 2.40636e−008
A6 = −2.71419e−010
A8 = 3.15903e−013

20th surface

K = −2.02027e+013
A4 = 3.75968e−007
A6 = 1.77693e−011
A8 = −2.46630e−015

26th surface

K = 1.07280e+002
A4 = −3.52261e−007
A6 = −4.00314e−012
A8 = −3.41561e−015

Various data
Zoom ratio 100.00

| | | | | |
|---|---|---|---|---|
| Focal length | 9.30 | 233.61 | 586.79 | 930.00 |
| F-number | 1.85 | 1.85 | 3.09 | 4.90 |
| Half angle of view | 30.60 | 1.35 | 0.54 | 0.34 |
| Image height | 5.50 | 5.50 | 5.50 | 5.50 |
| Total lens length | 621.60 | 621.60 | 621.60 | 621.60 |
| BF | 12.00 | 12.00 | 12.00 | 12.00 |
| d10 | 1.07 | 156.69 | 166.56 | 169.75 |
| d15 | 6.14 | 9.05 | 7.98 | 7.43 |
| d18 | 271.35 | 66.34 | 23.99 | 1.79 |
| d25 | 3.10 | 7.11 | 10.01 | 5.08 |
| d27 | 2.00 | 44.47 | 75.11 | 99.60 |
| Entrance pupil position | 130.02 | 2149.91 | 5461.33 | 10726.41 |
| Exit pupil position | −1881.51 | −1881.51 | −1881.51 | −1881.51 |
| Front principal point position | 139.27 | 2354.70 | 5866.28 | 11199.64 |
| Rear principal point position | 2.70 | −221.61 | −574.79 | −918.00 |

Zoom lens unit data

| Unit | Start surface | Focal length | Lens structure length | Front principal point position | Rear principal point position |
|---|---|---|---|---|---|
| 1 | 1 | 238.05 | 107.51 | 57.27 | −21.69 |
| 2 | 11 | −54.61 | 20.50 | 1.61 | −12.94 |
| 3 | 16 | −65.48 | 6.00 | 0.08 | −3.22 |
| 4 | 19 | 85.83 | 36.56 | 3.47 | −20.27 |
| 5 | 26 | 221.30 | 6.04 | 3.22 | −0.57 |
| 6 | 28 | 66.96 | 149.35 | 64.68 | 14.78 |

TABLE 1

| Conditional Expression | Numerical Embodiment | | | | | |
|---|---|---|---|---|---|---|
| | 1 | 2 | 3 | 4 | 5 | 6 |
| (1) L2max/L2w | 1.8 | 1.52 | 2.12 | 1.35 | 1.34 | 1.48 |
| (2) L2max/L2t | 1.89 | 0.95 | 2.29 | 1.11 | 0.99 | 1.22 |
| (3) \|mrr/drr\| | — | — | — | 0.0044 | — | — |
| (4) f1(f2 + f3)/(f2 × f3) | −5.72 | −5.76 | −5.62 | −6.86 | −4.91 | −7.99 |
| (5) f2/f3 | 0.98 | 4.34 | 1.1 | 0.57 | 0.21 | 0.83 |
| (6) (R2 + R3)/(R2 − R3) | 5.23 | 14 | 4.86 | −0.39 | −0.42 | 1.22 |
| Z | 40 | 40 | 40 | 40 | 17 | 100 |
| fw | 11 | 11 | 11 | 11 | 8 | 9.3 |
| ftm1 | 145.5 | 145.5 | 145.5 | 145.5 | 58.1 | 233.6 |
| ftm2 | 304.3 | 304.3 | 304.3 | 304.3 | 102.4 | 586.8 |
| L2w | 3.16 | 2.94 | 3.44 | 7.68 | 2.44 | 6.14 |
| L2max | 5.7 | 4.46 | 7.3 | 10.34 | 3.27 | 9.05 |
| L2t | 3.02 | 4.67 | 3.18 | 9.29 | 3.31 | 7.43 |
| mrr | — | — | — | 0.1 | — | — |
| drr | — | — | — | 22.93 | — | — |
| f1 | 161.84 | 161.84 | 161.84 | 161.84 | 61 | 238.05 |
| f2 | −56.13 | −150 | −60.57 | −37.06 | −15.02 | −54.61 |
| f3 | −57.06 | −34.54 | −54.93 | −64.91 | −72.04 | −65.48 |
| R2 | −55.05 | −37.64 | −55.42 | 27.19 | 110.15 | −554.77 |
| R3 | −37.37 | −32.62 | −36.5 | −61.26 | −269.74 | −54.95 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-021499, filed Feb. 8, 2017, which is hereby incorporated by reference herein in its entirety.

What is claimed is:

1. A zoom lens comprising in order from an object side to an image side thereof:
    a first lens unit having a positive refractive power and configured not to move for zooming;
    a second lens unit having a negative refractive power and configured to move for zooming;
    a third lens unit having a negative refractive power and configured to move for zooming;
    an intermediate lens group including at least one lens unit and configured to move for zooming; and
    a rear lens group including at least one lens unit, a lens unit therein, closest to the object side in the rear lens group, being configured not to move for zooming,
    wherein the zoom lens comprises an aperture stop placed on a side of the object with respect to the rear lens group or placed in the rear lens group,
    wherein a distance between each pair of adjacent ones of the lens units changes for zooming, and
    wherein the zoom lens satisfies conditional expressions $1.3 < L2max/L2w < 3.0$, $0.8 < L2max/L2t < 4.0$, and $0.1 < f2/f3 < 6.0$, where L2w is a distance between the second lens unit and the third lens unit at a wide angle end, L2t is a distance between the second lens unit and the third lens unit at a telephoto end, L2max is a maximum distance between the second lens unit and the third lens unit in a zoom range from a focal length ftm1 to a focal length ftm2, and f2 and f3 are focal lengths of the second lens unit and the third lens unit, respectively, ftm1 and ftm2 being respectively defined as $ftm1 = fw \times Z^{0.7}$, and $ftm2 = fw \times Z^{0.9}$, where fw is a focal length of the zoom lens at the wide angle end, and Z is a zoom ratio of the zoom lens.

2. The zoom lens according to claim 1, wherein the rear lens group comprises two convex lenses and a concave lens and is configured not to move for zooming.

3. The zoom lens according to claim 1, wherein
    the rear lens group comprises two convex lenses and a concave lens,
    a lens unit LRR included in the rear lens group is configured to move for zooming, and
    the zoom lens satisfies a conditional expression $|mrr/drr| < 0.1$, where mrr is a maximum movement amount of the lens unit LRR in an entire zoom range of the zoom lens, and drr is a distance between a surface, of the lens unit LRR, closest to the object and a surface, of the lens unit LRR, closest to an image of the zoom lens.

4. The zoom lens according to claim 1, wherein the zoom lens satisfies a conditional expression $-10.0 < f1 \times (f2+f3)/(f2 \times f3) < -2.0$, where f1, f2, and f3 are focal lengths of the first lens unit, the second lens unit, and the third lens unit, respectively.

5. The zoom lens according to claim 1, wherein the second lens unit and the third lens unit collectively comprise a convex lens and two concave lenses.

6. The zoom lens according to claim 1, wherein the second lens unit and the third lens unit comprise an aspherical surface.

7. The zoom lens according to claim 1, wherein the zoom lens satisfies a conditional expression $-2 < (R2+R3)/(R2-R3) < 30$, where R2 is a radius of curvature of a surface, of the second lens unit, closest to an image of the zoom lens, and R3 is a radius of curvature of a surface, of the third lens unit, closest to the object.

8. An image pickup apparatus comprising:
a zoom lens comprising in order from an object side to an image side thereof:
   a first lens unit having a positive refractive power and configured not to move for zooming;
   a second lens unit having a negative refractive power and configured to move for zooming;
   a third lens unit having a negative refractive power and configured to move for zooming;
   an intermediate lens group including at least one lens unit and configured to move for zooming; and
   a rear lens group including at least one lens unit, a lens unit therein, closest to the object side in the rear lens group, being configured not to move for zooming,
   wherein the zoom lens comprises an aperture stop placed on a side of the object with respect to the rear lens group or placed in the rear lens group,
   wherein a distance between each pair of adjacent ones of the lens units changes for zooming, and
   wherein the zoom lens satisfies conditional expressions $1.3 < L2\mathrm{max}/L2w < 3.0$, $0.8 < L2\mathrm{max}/L2t < 4.0$, and $0.1 < f2/f3 < 6.0$, where L2w is a distance between the second lens unit and the third lens unit at a wide angle end, L2t is a distance between the second lens unit and the third lens unit at a telephoto end, L2max is a maximum distance between the second lens unit and the third lens unit in a zoom range from a focal length ftm1 to a focal length ftm2, and f2 and f3 are focal lengths of the second lens unit and the third lens unit, respectively, ftm1 and ftm2 being respectively defined as $ftm1 = fw \times Z^{0.7}$, and $ftm2 = fw \times Z^{0.9}$, where fw is a focal length of the zoom lens at the wide angle end, and Z is a zoom ratio of the zoom lens; and
an image pickup element configured to receive an image formed by the zoom lens.

* * * * *